US009634820B2

United States Patent
Kazmi et al.

(10) Patent No.: US 9,634,820 B2
(45) Date of Patent: Apr. 25, 2017

(54) METHOD AND ARRANGEMENT IN A COMMUNICATIONS NETWORK

(71) Applicant: Telefonaktiebolaget LM Ericsson (publ), Stockholm (SE)

(72) Inventors: Muhammad Kazmi, Bromma (SE); Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 14/130,124

(22) PCT Filed: May 13, 2013

(86) PCT No.: PCT/SE2013/050530
§ 371 (c)(1),
(2) Date: Dec. 30, 2013

(87) PCT Pub. No.: WO2013/172769
PCT Pub. Date: Nov. 21, 2013

(65) Prior Publication Data
US 2014/0133428 A1    May 15, 2014

Related U.S. Application Data

(60) Provisional application No. 61/647,972, filed on May 16, 2012.

(51) Int. Cl.
*H04L 5/00*    (2006.01)
*H04W 72/12*    (2009.01)
(Continued)

(52) U.S. Cl.
CPC ........... *H04L 5/0078* (2013.01); *H04W 24/02* (2013.01); *H04W 72/1289* (2013.01); *H04L 5/0098* (2013.01); *H04W 24/10* (2013.01)

(58) Field of Classification Search
CPC ... H04W 24/02; H04W 24/10; H04W 52/146; H04W 56/0045; H04W 72/0413;
(Continued)

(56) References Cited

U.S. PATENT DOCUMENTS 8,934,346 B2 *   1/2015   Ye .................... H04W 74/002
                                                    370/229
8,948,119 B2 *   2/2015   Ahn .................. H04W 52/146
                                                    370/329

(Continued)

FOREIGN PATENT DOCUMENTS

WO    2011083991 A2    7/2011
WO    2012096502 A2    7/2012

OTHER PUBLICATIONS

International Search Report and Written Opinion (PCT/ISA/210) dated Aug. 14, 2013 for corresponding International Application No. PCT/SE2013/050530; International Filing Date: May 13, 2013 consisting of 11-pages.

(Continued)

*Primary Examiner* — Benjamin H Elliott, IV
*Assistant Examiner* — Eric Nowlin
(74) *Attorney, Agent, or Firm* — Christopher & Weisberg, P.A.

(57) ABSTRACT

A method in a network node for adapting a Secondary cell, SCell, command to a user equipment, UE, is provided. The SCell command is one of a setup and release command. The network node adapts the SCell command by one of advancing and delaying the timing of sending said SCell command with respect to a start of a transmission occasion of disjoint signals on which one of the UE and the network node is performing at least one of a measurement, the disjoint signal is a signal that is not used for performing the measurement in every subframe, a data transmission, the disjoint signal is a signal that is not used for transmitting the data in every (Continued)

subframe, and a data reception, the disjoint signal is a signal that is not used for receiving the data reception in every subframe.

24 Claims, 6 Drawing Sheets

(51) Int. Cl.
*H04W 24/02* (2009.01)
*H04W 24/10* (2009.01)

(58) Field of Classification Search
CPC .......... H04W 72/042; H04W 72/0446; H04W 72/0453; H04W 72/0473; H04W 72/1289; H04W 74/0833; H04W 76/046; H04L 5/001; H04L 5/0078; H04L 5/0098; H04B 7/18539; H04B 7/18543; H04B 7/18567
See application file for complete search history.

(56) References Cited

U.S. PATENT DOCUMENTS

| | | | | |
|---|---|---|---|---|
| 9,414,410 | B2* | 8/2016 | Jang | H04W 74/0833 |
| 2012/0176926 | A1* | 7/2012 | Jang | H04L 5/001 |
| | | | | 370/252 |
| 2012/0281655 | A1 | 11/2012 | Jung et al. | |
| 2013/0114574 | A1* | 5/2013 | Ng | H04W 56/0015 |
| | | | | 370/336 |
| 2014/0219185 | A1* | 8/2014 | Etemad | H04L 5/0091 |
| | | | | 370/329 |
| 2014/0233542 | A1* | 8/2014 | Bergstrom | H04L 5/0085 |
| | | | | 370/336 |
| 2015/0036666 | A1* | 2/2015 | Blankenship | H04W 72/044 |
| | | | | 370/336 |
| 2015/0043543 | A1* | 2/2015 | Uchino | H04W 56/0045 |
| | | | | 370/336 |
| 2015/0071198 | A1* | 3/2015 | Deng | H04W 74/006 |
| | | | | 370/329 |
| 2015/0230268 | A1* | 8/2015 | Chen | H04L 5/14 |
| | | | | 370/280 |
| 2016/0255621 | A1* | 9/2016 | Wu | H04W 72/0413 |

OTHER PUBLICATIONS

PCT Notification Concerning Transmittal of International Preliminary Report on Patentability Form/PCT/IB/326, for corresponding International Application No. PCT/SE2013/050530; International Filing Date: May 13, 2013 consisting of 8-pages.
3GPP TSG-RAN WG4 Meeting #56 R4-103210, Madrid, Spain, Source: Ericsson, ST-Ericsson, Title: "Analysis of Activation/Deactivation of Secondary Cell", Agenda item: 8.3.1.3, Document for: Discussion held Aug. 23-27, 2010 consisting of 3-pages.
3GPP TS 36.331 V10.5.0 (Mar. 2012), 3rd Generation Partnership Project; Technical Specification Group Radio Access Network; Evolved Universal Terrestrial Radio Access (E-UTRA); Radio Resource Control (RRC); Protocol specification (Release 10) dated Mar. 13, 2012 consisting of 302-pages.
3GPP TS 36.321 V10.5.0 (Mar. 2012) 3rd Generation Partnership Project; Technical Specification Group Radio Access Network; Evolved Universal Terrestrial Radio Access (E-UTRA); Medium Access Control (MAC) protocol specification (Release 10) dated Mar. 16, 2012 consisting of 54-pages.
Australian Patent Examination Report No. 1 dated Nov. 22, 2016 for Australian National Phase Application Serial No. 2013263463, Australian National Phase Entry Date: Nov. 14, 2014 consisting of 2-pages.
Extended European Search Report dated Jan. 4, 2017 for European Regional Phase Application Serial No. 16 201 105.0-1857 consisting of 10-pages.

* cited by examiner

US 9,634,820 B2

METHOD AND ARRANGEMENT IN A COMMUNICATIONS NETWORK

TECHNICAL FIELD

Embodiments herein relate to a network node, a user equipment and methods therein. In particular, it relates to adapting a Secondary cell (SCell) command to the UE and adapting an SCell setup or release.

BACKGROUND

Wireless mobile communication networks are ubiquitous in many parts of the world. As technologies advance, improvements in network capacity, speed, bandwidth, latency, flexibility, and overall sophistication continue to improve. This results in a succession of versions, or revisions, of technical specifications for a given protocol or access technology, each version adding capabilities, such as advanced operating modes (e.g., discontinuous operations for power savings), multiple antennas, multiple carriers, different duplex modes, and the like.

One advanced feature of many third-generation wireless communication protocols is the provision for multiple signal carrier frequencies, or "carriers," known in the art as Carrier Aggregation (CA). By sending and receiving traffic on more than one carrier, networks may dramatically increase the communication bandwidth to suitably-equipped User Equipment (UE). In CA, a Primary downlink and uplink carrier (PCell) are defined for each UE, and one or more Secondary carriers SCell in the downlink, uplink, or both, may additionally be configured.

Modern wireless networks are characterized by adaptive operation, in which system parameters are constantly adapted to conform to changing network conditions. This requires UEs to measure system conditions, and report these measurements to the network. Additionally, advanced network management functions such as Self Optimizing Networks (SON) are also based on conditions measured and reported by UEs. Furthermore, many network functions, such as positioning, require extensive, although sporadic, signaling between a UE and the network. Much of this signaling between a UE and the network (in both uplink and downlink) occurs in a disjoint manner—that is, in irregular (noncontiguous) subframes, or according to various patterns in which individual transmissions are spread out over time, and occur in noncontiguous subframes. The disjoint nature of such singling is not an issue if a UE remains tuned to the same carrier.

In carrier aggregation, when the network activates, deactivates, configures or de-configures one or more Secondary Cells (SCell) of a UE, the UE is required to engage in various "overhead" signaling with the network on the SCell to effect the change. During this time, any function requiring a UE measurement, or disjoint signaling on a Primary Cell (PCell) (or a different SCell), may be impaired, as the UE will "miss" some or all of the signaling, and is unable to transmit measurement data. Some disjoint signaling, such obtaining and reporting System Information on inter-frequency or inter-Radio Access Technology (RAT) cells, may take on the order of seconds, which is a very long duration in the context of modern wireless communication networks. Accordingly, the performance degradation associated with the missed measurements, or of the function engaging in disjoint signaling, may be severe.

The Background section of this document is provided to place embodiments herein in technological and operational context, to assist those of skill in the art in understanding their scope and utility. Unless explicitly identified as such, no statement herein is admitted to be prior art merely by its inclusion in the Background section.

SUMMARY

It is an object of embodiments herein to provide a way of improving the performance in a wireless communications network.

According to a first aspect of embodiments herein, the object is achieved by a method in a network node for adapting a Secondary cell, SCell, command to a user equipment, UE. The SCell command is a setup or release command. The UE is a multi-carrier capable UE. The network node adapts the SCell command by advancing or delaying the timing of sending said SCell command with respect to a start of a transmission of at least one of:

disjoint signals on which the UE or the network node is performing a measurement, wherein the disjoint signal is a signal that is not used for performing the measurement in every subframe, disjoint signals of a data transmission to the UE, wherein the disjoint signal is a signal that is not used for transmitting the data in every subframe, and disjoint signals of a data reception from the UE, wherein the disjoint signal is a signal that is not used for receiving the data reception in every subframe.

According to a second aspect of embodiments herein, the object is achieved by a method in a User Equipment, UE, for adapting a Secondary Cell, SCell, setup or release. The UE is served by a network node. The UE receives a SCell setup or release command from the network node. The UE then adapts the SCell setup or release by delaying the timing of applying said command to at least partly avoid collision with a transmission of at least one of:

disjoint signals on which the UE or the network node is performing a measurement, wherein the disjoint signal is a signal that is not used for performing the measurement in every subframe, disjoint signals of a data transmission to the network node wherein the disjoint signal is a signal that is not used for transmitting the data in every subframe, and disjoint signals of a data reception from the network node, wherein the disjoint signal is a signal that is not used for receiving the data reception in every subframe.

A network node for adapting a Secondary cell, SCell, command to a user equipment, UE, which SCell command is a setup or release command, and which UE 120 is a multi-carrier capable UE. The network node comprises a processor configured to adapt the SCell command by advancing or delaying the timing of sending said SCell command with respect to a start of a transmission of at least one of:

disjoint signals on which the UE or the network node is performing a measurement, wherein the disjoint signal is a signal that is not used for performing the measurement in every subframe, disjoint signals of a data transmission to the UE, wherein the disjoint signal is a signal that is not used for transmitting the data in every subframe, and disjoint signals of a data reception from the UE, wherein the disjoint signal is a signal that is not used for receiving the data reception in every subframe.

According to a fourth aspect of embodiments herein, the object is achieved by a User Equipment, UE, for adapting a Secondary Cell, SCell, setup or release. The UE is configured to be served by a network node. The UE comprises a communication circuitry configured to receive an SCell setup or release command from the network node. The UE further comprises a processor configured to adapt the SCell setup or release by delaying the timing of applying said command to at least partly avoid collision with a transmission of at least one of:

disjoint signals on which the UE or the network node is performing a measurement, wherein the disjoint signal is a signal that is not used for performing the measurement in every subframe, disjoint signals of a data transmission to the network node wherein the disjoint signal is a signal that is not used for transmitting the data in every subframe, and disjoint signals of a data reception from the network node, wherein the disjoint signal is a signal that is not used for receiving the data reception in every subframe.

Since the network node adapts the SCell command by advancing or delaying the timing of sending said SCell command with respect to a start of a transmission occasion of disjoint signals, UE measurements on disjoint signals are facilitated, and UE measurement performance is improved when PCell is interrupted due to SCell setup or release. This implies that the performance in a wireless communications network has been improved.

Embodiments herein present numerous advantages over the prior art. The activation, deactivation, configuration or de-configuration of SCell may be performed without adversely affecting the measurements, data transmission and data reception performed by the UE on signals which are infrequently available to the UE. Also, the UE will meet all performance requirements of measurements done on disjoint signals, even if the SCell command partly or fully affects the signals on which UE measurement is done.

BRIEF DESCRIPTION OF THE DRAWINGS

Examples of embodiments herein are described in more detail with reference to attached drawings in which.

DETAILED DESCRIPTION

Figure 1:
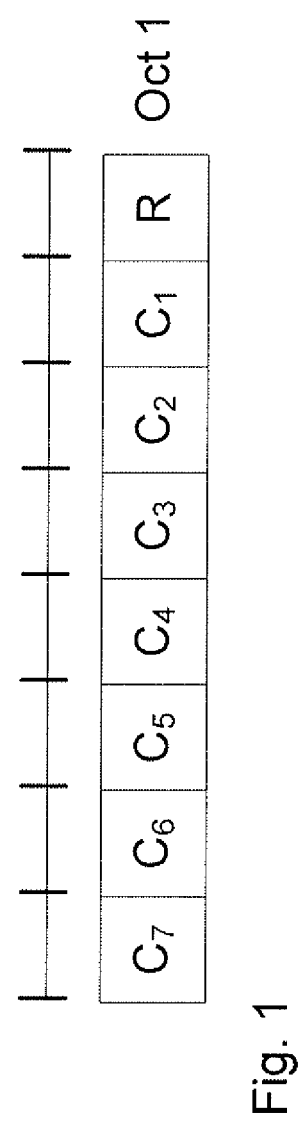
FIG. 1 depicts a MAC PDU subheader showing SCell activation.

As part of developing embodiments herein, a problem will first be identified and discussed.

To enhance peak-rates within a technology, multi-carrier or carrier aggregation solutions are known. For example, it is possible to use multiple 5 MHz carriers in High Speed Packet data Access (HSPA) to enhance the peak-rate within the HSPA network. Similarly in LTE for example multiple 20 MHz carriers or even smaller carriers (e.g., 5 MHz) can be aggregated in the UL and/or on DL. Each carrier in multi-carrier or carrier aggregation system is generally termed as a Component Carrier (CC) or sometimes is also referred to a cell. In simple words the CC means an individual carrier in a multi-carrier system. The term Carrier Aggregation (CA) is also called, e.g., interchangeably called, "multi-carrier system", "multi-cell operation", "multi-carrier operation", "multi-carrier" transmission and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE 120 specific signaling. The primary CC exists in both uplink and downlink direction CA. The network may assign different primary carriers to different UE 120s operating in the same sector or cell.

Therefore the UE 120 has more than one serving cell in downlink and/or in the uplink: one primary serving cell and one or more secondary serving cells operating on the PCC and SCC respectively. The serving cell is interchangeably called as Primary cell (PCell) or primary serving cell (PSC). Similarly, the secondary serving cell is interchangeably called as Secondary Cell (SCell) or secondary serving cell (SSC). Regardless of the terminology, the PCell and SCell(s) enable the UE 120 to receive and/or transmit data. More specifically the PCell and SCell exist in DL and/or UL for the reception and transmission of data by the UE 120. The remaining non-serving cells on the PCC and SCC are called neighbor cells.

The CCs belonging to the CA may belong to the same frequency band (also known as intra-band CA) or to different frequency band (inter-band CA) or any combination thereof (e.g., two CCs in band A and one CC in band B). The inter-band CA comprising of carriers distributed over two bands is also called as Dual-Band-Dual-Carrier-High Speed Downlink Packet Access (DB-DC-HSDPA) in HSPA or inter-band CA in LTE. Furthermore the CCs in intra-band CA may be adjacent or non-adjacent in frequency domain, also known as intra-band non-adjacent CA. A hybrid CA comprising of intra-band adjacent, intra-band non-adjacent and inter-band is also possible. Using carrier aggregation between carriers of different technologies is also referred to as "multi-RAT carrier aggregation" or "multi-RAT-multi-carrier system" or simply "inter-RAT carrier aggregation". For example, the carriers from Wideband Code Division Multiple Access (WCDMA) and LTE may be aggregated. Another example is the aggregation of LTE and Code Division Multiple Access (CDMA) 2000 carriers. For the sake of clarity the carrier aggregation within the same technology as described can be regarded as 'intra-RAT' or simply 'single RAT' carrier aggregation. However, the term CA used further herein may refer to any type of carrier aggregation, unless explicitly stated.

The CCs in CA may or may not be co-located in the same site or base station or radio network node 110, e.g., relay, mobile relay etc. For instance, the CCs may originate, i.e., transmitted/received, at different locations such as e.g., from non-located Base stations (BSs) or from BS and Remote Radio Heads (RRHs) or Remote Radio Units (RRUs). The well-known examples of combined CA and multi-point communication are Distributed Antenna Systems (DAS), RRH, RRU, Coordinated Multi-Point multi-point transmission/reception (CoMP) etc. Embodiments herein also apply to the multi-point carrier aggregation systems.

The multi-carrier operation may also be used in conjunction with multi-antenna transmission. For example, signals on each CC may be transmitted by the eNB to the UE 120 over two or more transmit and/or receive antennas.

According to 3GPP LTE Release 12 carrier aggregation, one or more SCells may also operate on an Additional Carrier Type (ACT), which is also called as New Carrier Type (NCT). An ACT or NCT is a SCC but the cells on NCT may comprise a reduced number of certain types of signals in time and/or in frequency domain. For example a cell on NCT may comprise Cell Specific Reference signals (CRS) only in one subframe per 5 ms. The CRS may also be reduced in the frequency domain, e.g., CRS over central 25 Resource Blocks RBs, i.e. RBs in the center of the bandwidth, even if cell bandwidth is larger than 25 RBs. In a legacy carrier the CRS are transmitted in every subframe over the entire bandwidth. Also synchronization signals may potentially have a reduced density in time, compared to 5 ms in the legacy network, and even be transmitted according to a configurable pattern. The SCell on NCT is therefore used for receiving data whereas important control information is mainly sent on the PCell which is transmitted on PCC. The PCC is always a normal legacy carrier, i.e., contains all 3GPP LTE Release-8 common channels and signals.

Multi-Carrier Setup or Release Procedure

A multi-carrier setup herein refers to a procedure which enables the network to at least temporarily setup or release the use of SCell, in DL and/or UL by a CA capable UE 120. There are two main concepts associated with the SCell setup or release: Configuration and de-configuration of SCell(s), and Activation and deactivation of SCell(s).

The configuration procedure is used by the eNode B to configure a CA UE 120 capable with one or more SCells, DL SCell, UL SCell or both. On the other hand, the de-configuration procedure is used by the eNode B to de-configure or remove one or more already configured SCells, DL SCell, UL SCell or both. The configuration or de-configuration procedure is also used to change the current multi-carrier configuration, e.g., for increasing or decreasing the number of SCells or for swapping the existing SCells with new ones. The configuration and de-configuration are done by the eNode B using RRC signaling.

An eNode B in LTE may activate one or more SCells or deactivate one or more SCells on the corresponding secondary carriers. The SCells which are only configured by the eNodeB may be activated or deactivated. A PCell is always activated. The configured SCells are initially deactivated upon addition and after a handover.

The network activates and deactivates the SCell(s) by sending the Activation/Deactivation MAC control element. The Activation/Deactivation command or more specifically, "Activation/Deactivation Medium Access Control (MAC) Control Element (CE)" is sent via MAC to the UE 120. This MAC CE is identified by a MAC Protocol Data Unit (PDU) subheader as shown in FIG. 1.

The MAC CE has a fixed size and comprises a single octet containing seven C-fields and one R-field. The $C_i$ and R fields in the Activation/Deactivation MAC control element are defined as follows:

$C_i$: if there is an SCell configured with SCellIndex i as specified in 3GPP TS 36.331 V10.5.0 (2012 March), this field indicates the activation/deactivation status of the SCell with SCellIndex i, else the UE 120 shall ignore the $C_i$ field. The $C_i$ field is set to "1" to indicate that the SCell with SCellIndex i shall be activated. The $C_i$ field is set to "0" to indicate that the SCell with SCellIndex i shall be deactivated;

R: Reserved bit, set to "0".

Typically the deactivation is done when there is no data to transmit on the SCell(s) to enable UE 120 battery saving. Currently both UL and DL SCells are activated and/or deactivated simultaneously upon receiving the MAC CE. But in principle the activation/deactivation can be done independently on uplink and downlink SCells.

Interruption at Multi-Carrier Setup or Release

The SCell setup or release, i.e., when SCell is configured, de-configured, activated or deactivated, may cause glitch or interruption on the PCell or any other SCell. The glitch mainly occurs when the UE 120 has a single radio chain to receive and/or transmit more than one CC. A radio chain comprises of at least one Radio Frequency (RF) power amplifier to amplify the received radio signal and/or to amplify the radio signal before transmitting it on a radio interface. A multiple radio chains comprise of multiple independent RF power amplifiers. For example, in case of intra-band carrier aggregation, where CCs are adjacent, the UE 120 may typically have a single radio if the aggregated bandwidth is 40 MHz, e.g., 2 carriers each of 20 MHz.

The glitch mainly occurs when a CA capable UE 120 changes its reception and/or transmission bandwidth from single-carrier to multiple-carrier operation or vice versa. In order to change the bandwidth the UE 120 has to reconfigure its radio frequency (RF) components in the RF chain, e.g., RF filter, Power Amplifier (PA), etc. For example, consider CA capable UE 120 supporting two DL component carriers each of 20 MHz: one PCC and one SCC. If the SCC is deactivated by the serving/PCell, then the UE 120 will shorten its bandwidth, e.g., from 40 MHz to 20 MHz. This may cause 5-10 ms interruption on the PCell on PCC. Similarly, if the SCell is configured or de-configured, then the PCell may be interrupted for 15-20 ms.

Setup/release of a DL SCell may also cause interruptions in UL, e.g., when the SCell and PCell, or another SCell, are Time Division Duplexing (TDD) cells which may have the same or different DL/UL subframe configurations, or even when both SCell and PCell, or another SCell, are Frequency Division Duplexing (FDD) cells. Similarly, setup/release of an UL SCell may also cause interruptions in DL, e.g., when the SCell and PCell or another SCell are TDD cells which may have the same or different DL/UL subframe configurations, or even when both SCell and PCell or another SCell are FDD cells.

During the interruption period the UE 120 cannot receive from and/or transmit any signal or information to the network. During the interruption the UE 120 also cannot perform measurements due to its inability to receive and/or transmit signals.

The bandwidth reduction when SCell is deactivated or de-configured has benefits from the UE 120 perspective. It prevents the UE 120 from receiving the noise outside the current reception bandwidth, and it saves UE 120 battery life by lowering the power consumption.

Transmit Patterns and Measurement Patterns for eICIC

To facilitate measurements in the extended cell range, i.e., where high interference is expected, the standard specifies Almost Blank Subframe (ABS) patterns for eNodeBs and restricted measurement patterns for UE 120s. A pattern that can be configured for eICIC is a bit string indicating restricted and unrestricted subframes characterized by a length and periodicity, which are different for FDD and TDD, 40 subframes for FDD and 20, 60, or 70 subframes for TDD. Only DL patterns have been specified so far for interference coordination in 3GPP, although patterns for UL interference coordination are also known in the art.

Measurements

Definitions of currently standardized measurements in LTE are in 3GPP TS 36.214. In LTE the measurements are done for various purposes, e.g., mobility (also known as RRM measurements), positioning, SON, MDT, etc. It is typically mandatory for all UE 120s to support all intra-RAT measurements, i.e., inter-frequency and intra-band measurements, and meet the associated requirements. However, the inter-band and inter-RAT measurements are UE 120 capabilities, which are reported to the network during the call setup. The UE 120 supporting certain inter-RAT measurements should meet the corresponding requirements. For example, a UE 120 supporting LTE and WCDMA should support intra-LTE measurements, intra-WCDMA measurements and inter-RAT measurements, i.e., measuring WCDMA when serving cell is LTE and measuring LTE when serving cell is WCDMA. Hence network can use these capabilities according to its strategy.

PCell Interruption

When one or more SCell(s) are configured, de-configured, activated or deactivated, the PCell is interrupted. This will adversely affect the positioning measurements or measurements performed for other purposes, e.g., RRM, MDT, SON, etc. which are performed over signals which (1) are not transmitted by the UE 120 and/or radio network node 110 very frequently and/or (2) are measured by the UE 120 according to a pattern indicating for UE 120 measurements in disjoint time instances and/or (3) are measured by a radio network node 110 infrequently, e.g., according to a pattern indicating for the radio network node 110 measurements in disjoint time instances.

For example, if the UE 120 is doing an OTDOA positioning measurement, RSTD, which may be done on PRS or CRS transmitted in positioning occasions, which are also a sort of configurable pattern, the RSTD accuracy will be deteriorated if the interruption overlaps with the PRS. The OTDOA RSTD measurement is quite often used for critical services, e.g., emergency calls. Some of these critical services are required to meet the regulatory requirements, e.g., UE 120 positioning accuracy, response time to determine the UE 120 position etc. The advantage of configuring positioning occasions is that they typically have improved interference conditions, due to reduced data transmissions in interfering cells, and thus improve hearability of signals used for positioning measurements, but these low-interference positioning occasions cannot be configured too frequently in time to avoid data capability loss.

Another example is when UL measurements are performed based on UL signal transmissions from the UE 120, the measurements may be performed by the serving eNodeB but also other radio nodes, e.g. LMU, and there is a SCell setup or release which impacts UL measurements. Some examples of measurements are UL positioning measurements (UL RTOA, UL AoA) or UL measurements for general RRM purpose or any eNodeB measurement specified in LTE 3GPP 36.214.

Yet another example is when a two-directional measurement is performed, e.g., by the UE 120 or a radio network node 110, where the two-directional measurement may be, e.g., RTT or UE 120 Rx-Tx or eNodeB Rx-Tx or similar, and there is a SCell setup/release which impacts UL measurements. Some examples of measurements are positioning measurements (e.g., UE 120 Rx-Tx) or general RRM measurements, e.g., timing advance.

Still another example is when one or more SCell(s) are configured, de-configured, activated or deactivated, while the UE 120 is acquiring the SI of a neighbor cell. The SI is acquired by reading the MIB and relevant SIBs, which are sparsely transmitted, i.e., not in every downlink subframe. The PCell interruption may disrupt or significantly delay the acquisition of SI reading. This in turn will result in poor performance, e.g., it will deteriorate mobility performance.

Yet another example is when a UE 120 is receiving broadcast traffic in downlink occasions, some of which are disjoint, e.g., there are other downlink subframes in between which are not used for receiving signals. One example of the broadcast traffic is MBMS transmitted in MBSFN subframes and MBSFN pattern configuration is obtained by the UE 120, e.g., via higher-layer signaling from a network node 110. Receiving the MBMS traffic may be disturbed by SCell configuration/de-configuration/activation/de-activation.

Yet another example is when a UE 120 is receiving data according to a pattern, e.g., semi-persistent scheduling, which may be used, e.g., for delay-sensitive traffic such voice communication. One example of SPS data periodicity is 20 ms.

Yet another example is when a UE 120 is requested to perform measurements according to a specific measurement pattern indicating a disjoint set of time instances for measurements, while configuration, de-configuration, activation or deactivation of a SCell occurs, which may degrade the pattern-based measurement performance. Note that a transmit pattern may also be viewed as an implicit indication when measurements may be performed and occasions when the signals of interest are not transmitted may be avoided.

Particularly in cases where the SCell is in a different frequency band than its PCell, also (known as inter-frequency) or if the SCell is in a different inter-RAT, the UE must retune its transceiver from its carrier frequency to the SCell carrier frequency to complete the SCell activation/deactivation.

One more detailed example is a heterogeneous deployment when a UE 120 is configured with a measurement resource restriction pattern, e.g., for performing any one or more of: RSRP, RSRQ, RLM, UE 120 Rx-Tx, CSI, etc.

Another example is when UL measurements are performed by the radio network node 110, e.g., in heterogeneous network deployment or for general RRM purpose, the UL signals being transmitted in disjoint time instances, e.g., Random Access Channel (RACH) or Sounding Reference (SRS).

DESCRIPTION OF EMBODIMENTS HEREIN

According to the discussion above it is an object of embodiments herein to provide a way of improving the performance in a wireless communications network.

Figure 2:
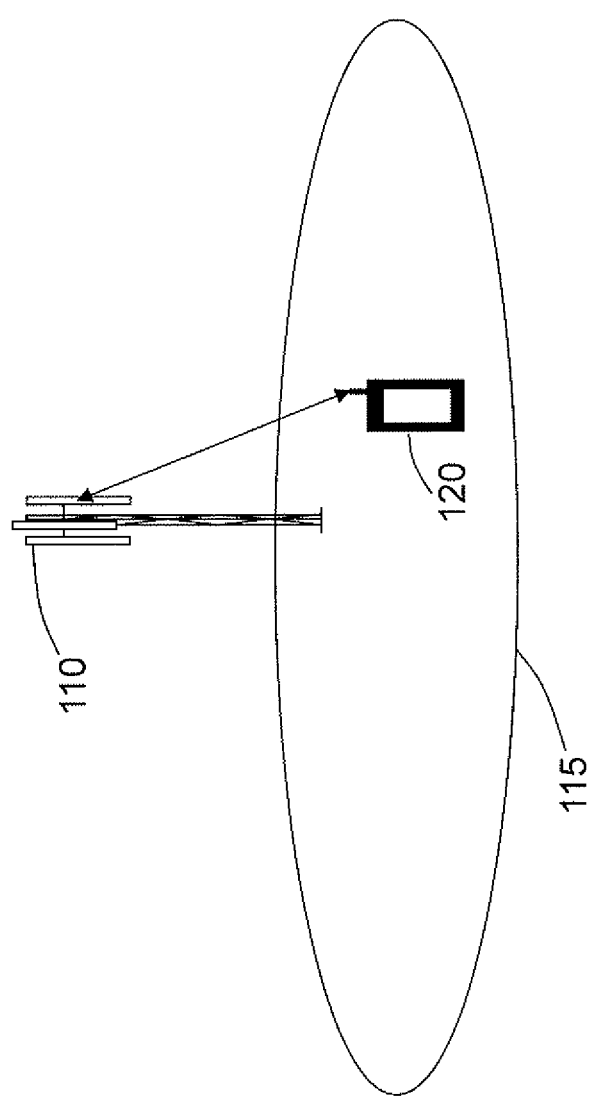
FIG. 2 depicts a wireless communications network.

FIG. 2 depicts an example of a wireless communications network 100 in which embodiments herein may be implemented. The wireless communications network 100 is a wireless communication network such as an LTE, WCDMA, GSM network, CDMA2000, High Rate Packet Data (HRPD), any 3GPP cellular network, Wimax, or any cellular network or system.

The wireless communications network 100 comprises a radio network node 110. The radio network node 110 may be a transmission point such as a radio base station, for example an eNB, an eNodeB, or a Home Node B, and Home eNode B or any other network node 110 capable to serve a UE 120 or a machine type communication device in a wireless communications network. The radio network node 110 serves a cell 115.

A User Equipment (UE) 120 is located in the cell 115, served by the radio network node 110. The UE 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. The UE 120 is a multi-carrier capable UE. Please note the term user equipment (UE) used in this document also covers other wireless devices such as Machine to machine (M2M) devices, even though they do not have any user.

Figure 3:
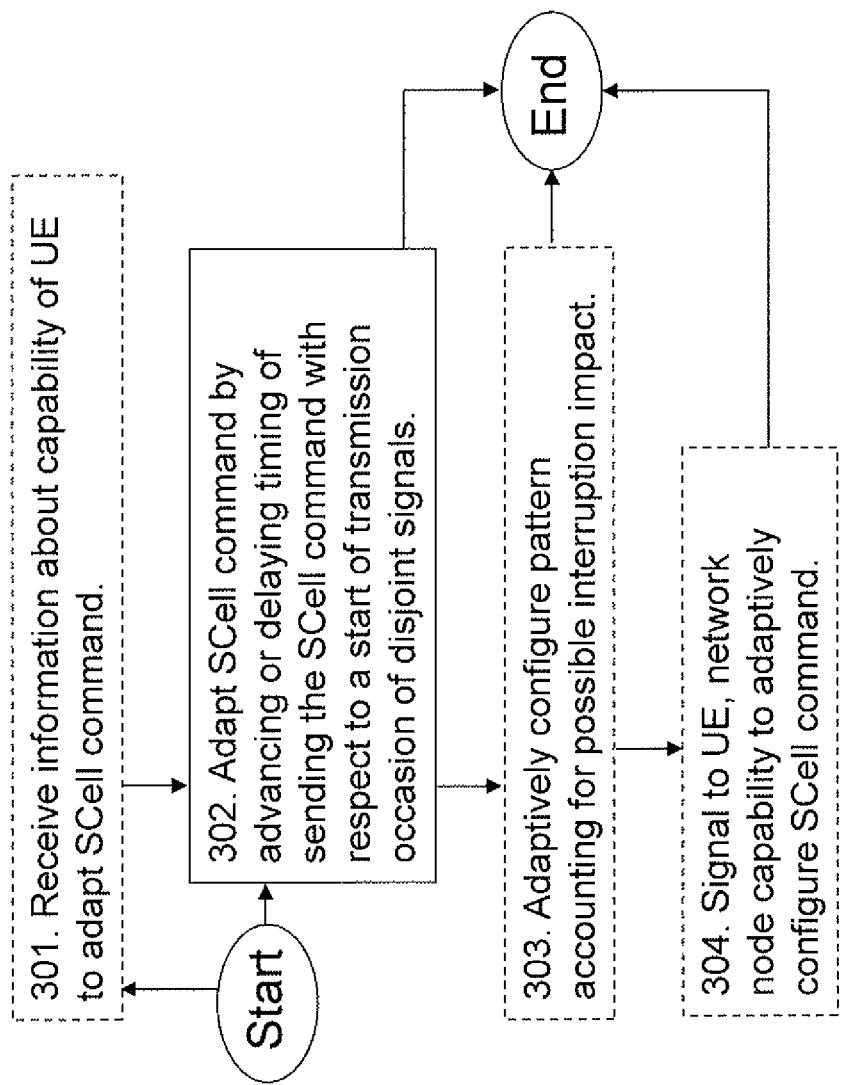
FIG. 3 is a flowchart depicting embodiments of a method in a network node.

Example of embodiments of a method in a network node 110 for adapting an SCell command to the UE 120 will now be described with reference to a flowchart depicted in FIG. 3. The SCell command is a setup or release command, and the UE 120 is a multi-carrier capable UE.

The method comprises the following actions, which actions may be taken in any suitable order. The method actions are briefly described here, but will be described more in detail below. Dashed lines of one box in FIG. 3 indicate that this action is not mandatory.

Action 301

This is an optional action. The network node 110 receives information from the UE 120. The information is related to the capabilities of the UE 120 to adapt the SCell command when the UE 120 or the network node 110 performs at least one out of: a measurement, a data reception, and a data transmission on the uplink and/or downlink disjoint signals.

In some embodiments the received information further comprises information related to disjoint signals on which the UE 120 is capable of adapting the SCell command.

Action 302

The network node 110 adapts the SCell command by advancing or delaying the timing of sending said SCell command with respect to a start of a transmission of at least one of:

disjoint signals on which the UE 120 or the network node 110 is performing a measurement, wherein the disjoint signal is a signal that is not used for performing the measurement in every subframe, disjoint signals of a data transmission to the UE 120, wherein the disjoint signal is a signal that is not used for transmitting the data in every subframe, and disjoint signals of a data reception from the UE 120, wherein the disjoint signal is a signal that is not used for receiving the data reception in every subframe.

This action of adapting the SCell command by advancing or delaying the timing of sending said command may further based on the information received from the UE 120 in action 301.

The said SCell setup or release command may e.g. be at least one of SCell activation, SCell deactivation, SCell configuration and SCell de-configuration.

Action 303

This is an optional action. In some embodiments the network node 110 adaptively configures at least one of: a transmit pattern, a measurement pattern, and scheduling pattern accounting for a possible interruption impact due to the SCell setup or release. The transmit pattern, the measurement pattern, and the scheduling pattern may e.g. be positioning occasions, PRS transmit pattern or PRS muting pattern, measurement resource restriction pattern, data pattern. The SCell setup or release may e.g. be on PCell or any SCell, in DL or UL.

Action 304

This is an optional action. In some embodiments, the network node 110 signals the network node's 110 capability to the UE 120 and/or another network node. The capability comprises the capability of adaptively configure the SCell command when the UE 120 or the network node 110 performs at least one of a measurement, a data reception and a data transmission on the uplink and/or downlink disjoint signals.

Figure 4:
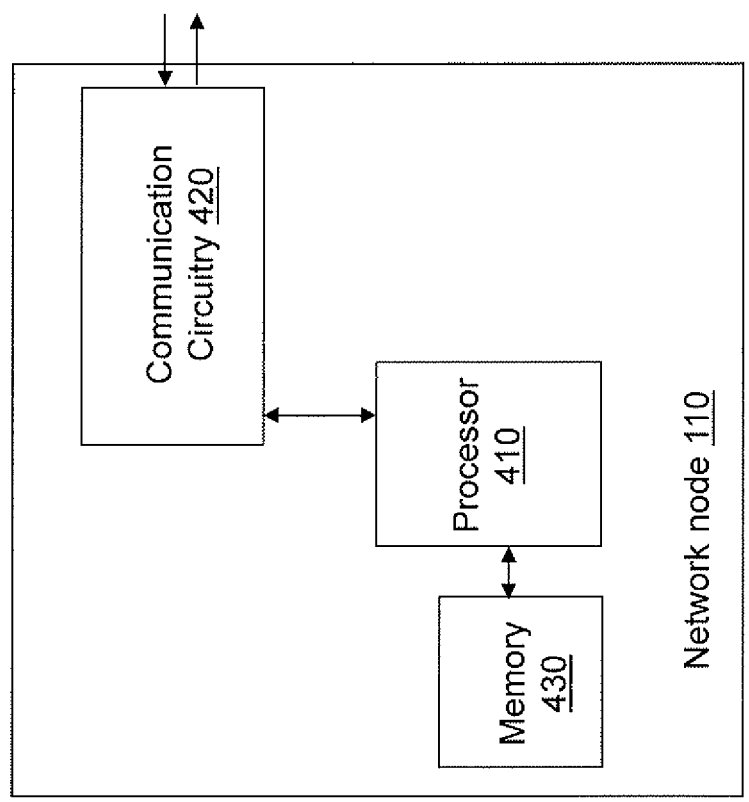
FIG. 4 is a schematic block diagram illustrating embodiments of a network node.

To perform the method actions for adapting the SCell command to the UE 120, described above in relation to FIG. 3, network node 110 comprises the following arrangement depicted in FIG. 4. As mentioned above the SCell command is a setup or release command, and the UE 120 is a multi-carrier capable UE.

The network node 110 comprises a processor 410 configured to adapt the SCell command by advancing or delaying the timing of sending said SCell command with respect to a start of a transmission of at least one of:

disjoint signals on which the UE 120 or the network node 110 is performing a measurement, wherein the disjoint signal is a signal that is not used for performing the measurement in every subframe, disjoint signals of a data transmission to the UE 120, wherein the disjoint signal is a signal that is not used for transmitting the data in every subframe, and disjoint signals of a data reception from the UE 120, wherein the disjoint signal is a signal that is not used for receiving the data reception in every subframe.

In some embodiments the processor 410 is further configured to adapt the SCell command by advancing or delaying the timing of sending said command is further based on the information received from the UE 120.

The said SCell setup or release command may e.g. be at least one of SCell activation, SCell deactivation, SCell configuration and SCell de-configuration.

The processor 410 further may be configured to adaptively configure at least one of: a transmit pattern, a measurement pattern, and scheduling pattern accounting for a possible interruption impact due to the SCell setup and/or release.

The network node 110 further comprises a communication circuitry 420 configured to receive information from the UE 120. The information is related to the capabilities of the UE 120 to adapt the SCell command when the UE 120 and/or the network node 110 perform at least one out of: a measurement, a data reception, and a data transmission on the uplink and/or downlink disjoint signals.

The information to be received may further comprise information related to disjoint signals on which the UE 120 is capable of adapting the SCell command.

In some embodiments, the communication circuitry 420 further is configured to signal the network node's 110 capability to the UE and/or another network node 110. The capability comprises the capability of adaptively configure the SCell command when the UE 120 and/or the network node 110 performs at least one of a measurement, a data reception and a data transmission on the uplink and/or downlink disjoint signals.

The embodiments herein handling the process of for adapting the SCell command to the UE 120 may be implemented through one or more processors, such as the processor 410 in the base station 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 430 comprising one or more memory units. The memory 630 is arranged to be used to store information is arranged to be used to store information, data, configurations, schedulings, and applications to perform the methods herein when being executed in the network node 110.

Those skilled in the art will also appreciate that the communication circuitry 420, described above may refer to a combination of analog and digital circuits, and/or one or more processors configured with software and/or firmware, e.g. stored in a memory such as the memory 430, that when executed by the one or more processors such as the processor 410 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Example of embodiments of method in a User Equipment, UE, 120 for adapting a Secondary Cell, SCell, setup or release will now be described with reference to a flowchart depicted in FIG. 5. The UE 120 is served by a network node 110. The method comprises the following actions, which actions may be taken in any suitable order. The method actions are briefly described here, but will be described more in detail below. Dashed lines of one box in FIG. 5 indicate that this action is not mandatory.

Action 501

This is an optional action. In some embodiments the UE 120 signals to the network node 110, that the UE 120 has capability to adapt the SCell setup or release of the SCell when performing the UE 120 and/or the network node 110 performs at least one out of a measurement, a data reception and a data transmission on the uplink and/or downlink disjoint signal.

Action 502

This is an optional action. The UE 120 may receive from the network node 110, the network node's 110 capability to adaptively configure SCell command when the UE 120 and/or the network node 110 performs at least one of a measurement, a data reception and a data transmission on the uplink and/or downlink disjoint signals.

Action 503

The UE 120 receives an SCell setup or release command from the network node 110 node.

Action 504

The UE 120 adapts the SCell setup or release by delaying the timing of applying said command to at least partly avoid collision with a transmission of at least one of:

disjoint signals on which the UE 120 or the network node 110 is performing a measurement, wherein the disjoint signal is a signal that is not used for performing the measurement in every subframe, disjoint signals of a data transmission to the network node 110 wherein the disjoint signal is a signal that is not used for transmitting the data in every subframe, and disjoint signals of a data reception from the network node 110, wherein the disjoint signal is a signal that is not used for receiving the data reception in every subframe.

The SCell setup may e.g. be at least one of SCell activation, SCell deactivation, SCell configuration and SCell de-configuration.

In some embodiments, the UE 120 is required to meet a first set of pre-defined requirements related to a measurement performed on disjoint signals, when adapting the SCell setup or release to avoid the collision.

In some embodiments, the UE 120 is required to meet a second set of pre-defined requirements related to a measurement performed on disjoint signals, when adapting 504 the SCell setup or release to partially avoid the collision.

Figure 5:
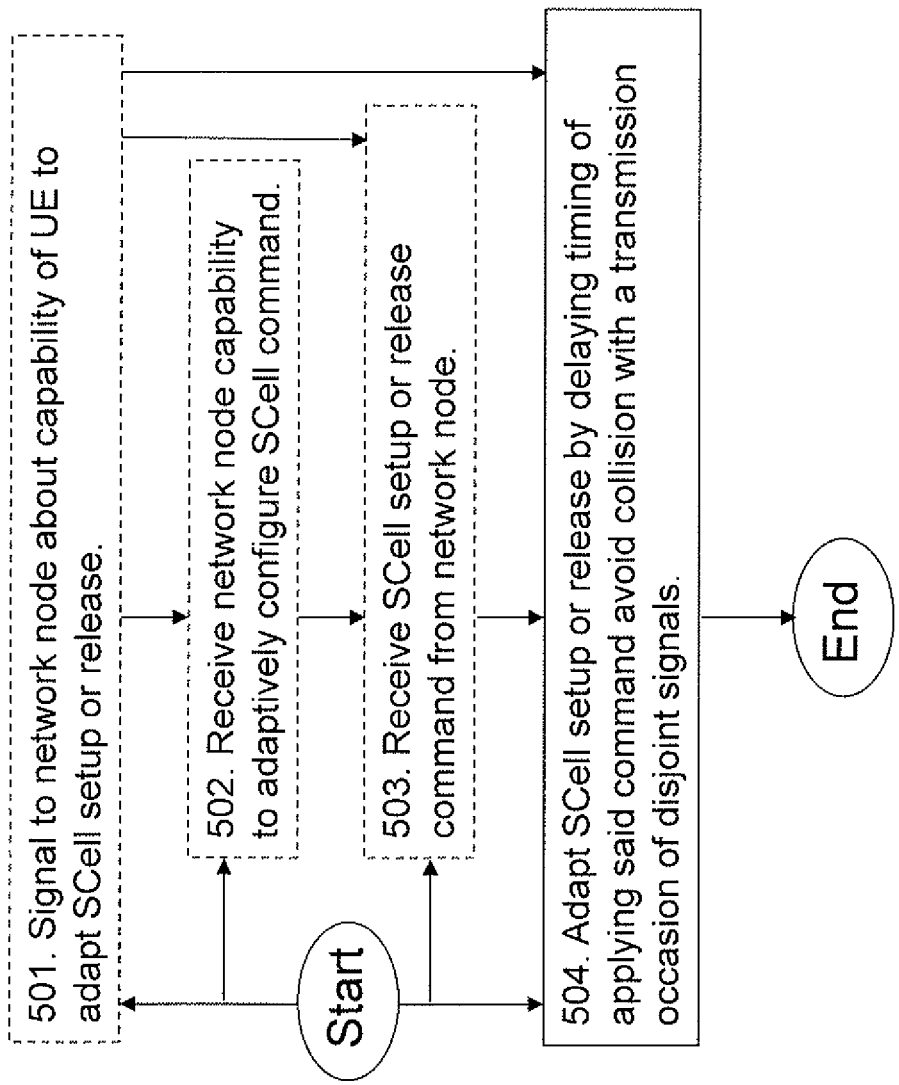
FIG. 5 is a flowchart depicting embodiments of a method in a user equipment.
Figure 6:
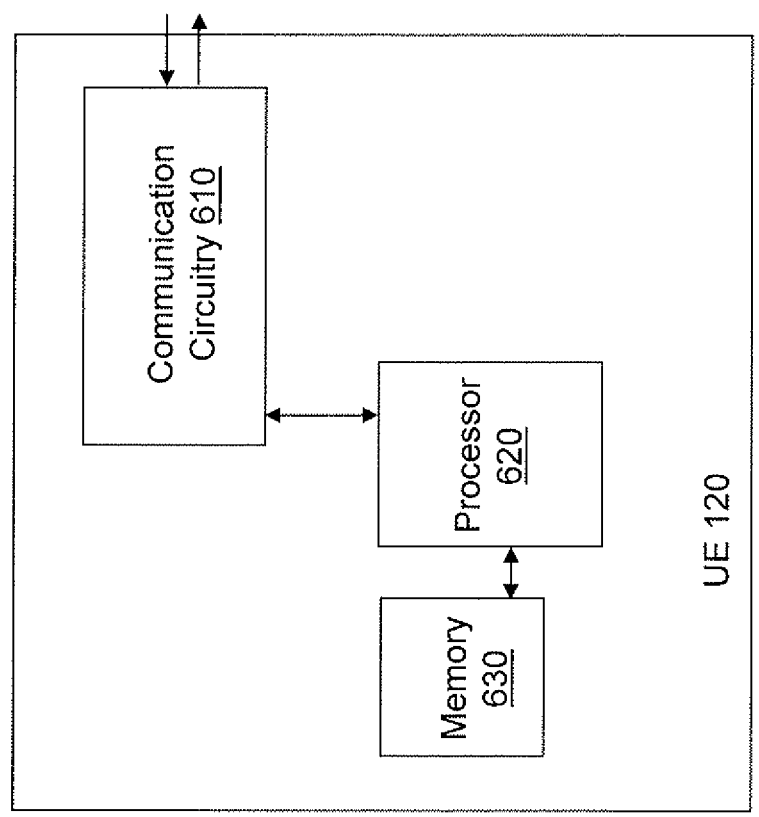
FIG. 6 is a schematic block diagram illustrating embodiments of a user equipment.

To perform the method actions for adapting an SCell setup or release, described above in relation to FIG. 5, the UE 120 comprises the following arrangement depicted in FIG. 6. As mentioned above the UE 120 is configured to be served by a network node 110.

The UE comprises a communication circuitry 610 configured to receive an SCell setup or release command from the network node 110 node.

The communication circuitry 610 may further be configured to signal to the network node 110, that the UE 120 has capability to adapt the SCell setup or release of the SCell when performing the UE 120 and/or the network node 110 performs at least one out of a measurement, a data reception and a data transmission on the uplink and/or downlink disjoint signal.

In some embodiments the communication circuitry 610 further is configured to receive from the network node 110, the network node's 110 capability to adaptively configure SCell command when the UE 120 and/or the network node 110 performs at least one of a measurement, a data reception and a data transmission on the uplink and/or downlink disjoint signals.

The UE further comprises a processor 620 configured to adapt the SCell setup or release by delaying the timing of applying said command to at least partly avoid collision with a transmission of at least one of:

disjoint signals on which the UE 120 or the network node 110 is performing a measurement, wherein the disjoint signal is a signal that is not used for performing the measurement in every subframe, disjoint signals of a data transmission to the network node 110 wherein the disjoint signal is a signal that is not used for transmitting the data in every subframe, and disjoint signals of a data reception from the network node 110, wherein the disjoint signal is a signal that is not used for receiving the data reception in every subframe.

The SCell setup may e.g. be at least one of SCell activation, SCell deactivation, SCell configuration and SCell de-configuration.

The UE 120 may be configured to be required to meet a first set of pre-defined requirements related to a measurement performed on disjoint signals, when adapting the SCell setup or release to avoid the collision.

In some embodiments the UE 120 is configured to be required to meet a second set of pre-defined requirements related to a measurement performed on disjoint signals, when adapting the SCell setup or release to partially avoid the collision.

The embodiments herein handling the process of adapting a Secondary Cell, SCell, setup or release may be implemented through one or more processors, such as the processor 620 in the UE 120 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the UE 120. One such carrier may be in the form of a CD ROM disc. It is however feasible with other data carriers such as a memory stick. The computer program code may furthermore be provided as pure program code on a server and downloaded to the UE 120.

The base station 110 may further comprise a memory 630 comprising one or more memory units. The memory 630 is arranged to be used to store information, data, configurations, schedulings, and applications to perform the methods herein when being executed in the UE 120.

Those skilled in the art will also appreciate that communication circuitry 610 described above may refer to a combination of analog and digital circuits, and/or one or more processors configured with software and/or firmware, e.g. stored in a memory such as the memory 630, that when executed by the one or more processors such as the processor 620 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

The text below is applicable to any of the embodiments above, even if not explicitly mentioned.

Embodiments herein may include at least some of the following aspects.

A method in the network node 110 of adapting a SCell setup or release command to assist the UE 120 in performing a measurement or receiving data on disjoint signals, or to assist the UE 120 in transmitting disjoint signals, or to assist a radio network node 110 in performing a measurement or receiving data in UL from the UE 120.

Method in the radio network node 110 of adapting at least one of the measurement pattern, scheduling pattern, transmit pattern configuration to configuring SCell/release commands.

Method in the UE 120 of adapting SCell setup/release when performing a measurement or receiving data on disjoint signals or transmitting UL disjoint signals.

Method in the UE 120 of meeting a pre-defined requirements when setup/release of SCell coincides with transmission and/or measurement occasion of disjoint signals used for a measurement.

Method in the UE 120 of reporting its capability related to adaption of SCell setup/release of SCell when performing a measurement or receiving data on disjoint signals or transmitting disjoint UL signals.

Method in a network node 110 of reporting its capability related to adapting SCell setup/release command.

Method in network node 110 of forwarding the information related to adaptation SCell setup/release to other nodes.

Methods in test system for verifying the procedures and pre-defined requirements.

Methods in the Network Node 110 of Adapting an SCell Setup or Release Command to Assist a Radio Node Such as the EU 120 in Performing Measurement or Receiving Data on Disjoint Signals or in Transmitting Disjoint Signals This embodiment describes methods in the network node 110, also referred to as the radio network node 110, of adapting an SCell setup/release command, i.e. setup or release command to assist a radio node, e.g., UE 120 or radio network node 110 in performing measurement or receiving data on disjoint signals or in transmitting disjoint signals. More details are provided for DL disjoint signals, however, given the teachings of this disclosure it is straightforward for those of skill in the art to derive similar procedures accounting for UL disjoint signals.

This embodiment may be implemented as standalone or in any combination with one or more of other embodiments in other sections, e.g., generalizations, signaling-related embodiments or UE 120-related embodiments.

The method in these embodiments is implemented in a network node 110 which sends SCell setup/release command to the multi-carrier capable UE 120.

It is assumed that when the network node 110 intends to send the SCell setup/release command to the UE 120, the UE 120 may be performing at least one measurement (e.g., Reference Signal Time Difference (RSTD), SI acquisition, RSRP and/or RSRQ on a cell on a NCT) on one or more set of disjoint signals (e.g., Positioning Reference Signal (PRS), Physical Broadcast Channel (PBCH) (MIB), Dedicated-Broadcast Channel (D-BCH), which is sent on Physical Data Channel (PDSCH) System Information Blocks (SIBs), CRS on a cell on new carrier type (NCT), etc.) and/or receive data on disjoint signals (e.g., system information, Multimedia Broadcast multicast service (MBMS), Semi Persistent Scheduling (SPS)-based data) or may be transmitting UL disjoint signals.

The inter-frequency and/or inter-RAT measurements performed by the UE 120 using measurement gaps are other examples of measurements done on disjoint signals. This is because the signals for doing inter-frequency and/or inter-RAT measurements are only available for the UE 120 during gaps which are separated typically by several frames, e.g., 40 ms. The SCell setup/release command which interrupts the PCell and/or SCell will also result in interruption of the gap if the said received command partially or fully overlaps with the gap. Therefore methods for adapting the SCell setup/release command in the network node 110 also take into account the occurrence of the measurement gaps if they are configured for one or more inter-frequency and/or inter-RAT measurements.

The network node 110 (e.g., serving network node 110 such as eNode B in LTE, Node B in HSPA etc.) first obtains information, which indicates whether the UE 120 is doing at least one of: performing a measurement or receiving data on disjoint signals or transmitting UL disjoint signals, which measurement may be expected by another radio node for UL measurements or may be used for performing two-directional measurements. This relates to Action 301. The information may also comprise additional details such as the type of measurement or data, carrier frequency on which measurement is performed, whether measurement is intra-frequency, inter-frequency, inter-RAT, carrier aggregation related, whether a measurement is performed using measurement gaps or without gaps, type of disjoint signals, type of carrier aggregation or CoMP type (e.g., intra-band contiguous, intra-band non-contiguous, inter-band), UE 120 capability in terms of receivers (e.g., whether UE 120 has single receiver such as 40 MHz for CA or multiple receivers such as 2×20 MHz for CA), transmission characteristics of disjoint signals (e.g., periodicity etc.), density of disjoint signals in each transmission occasion (e.g., number of PRS subframes in a positioning occasion), DL and/or UL measurement pattern configuration (e.g., periodicity, length, time alignment), DL and/or UL transmit pattern configuration, DL and/or UL scheduling pattern configuration, etc. The network node 110 may obtain the above mentioned information:

- Autonomously or internally if such information is available in the network node 110 (e.g., CRS transmission in NCT, measurement gap configuration used for assisting UE 120 in performing measurements in gaps etc.);
- Based on pre-defined rule or procedure (e.g., broadcast channel scheduling such as PBCH/SIB1 scheduling information);

From another network node such as positioning node (e.g., a transmit pattern of a UE 120 in a neighbor cell or a measurement pattern for UL or DL measurements); or From another node such as from a neighboring node. This information may comprise, for example:
  disjoint signal transmission occasion or periodicity in a neighbor node such as in another eNode B;
  measurement pattern, measurement gap pattern, transmit pattern or scheduling pattern indicating time instances at least some of which are disjoint (e.g., from O&M, SON, neighbor radio node, or positioning node);
  PRS information from a positioning node or another radio network node 110; or
  Information related to positioning measurements performed by a UE 120 from a positioning node, which configures UE 120 to perform these measurements.

From UE 120 such as information related to measurements performed on disjoint signals and which are configured by another node (e.g., positioning node, MDT node) or measurement pattern configured by another node; or Any implicit information from UE 120 or any node which depicts that the UE 120 is performing a particular type of measurement on disjoint signals. For example this can be a request or a message or IE sent by a UE 120 or by a positioning node to the eNode B to start measurement gaps for enabling the UE 120 to perform inter-frequency RSTD measurement on a non-serving carrier frequency. From such implicit information the network node 110 which sends command can determine that the UE 120 is doing measurement on disjoint signals, e.g., on PRS.

After obtaining the information that the UE 120 is doing one or more measurements and/or receiving data on disjoint signals or transmitting or expected to transmit UL disjoint signals, the network node 110 adapts the signaling of SCell setup/release command to the UE 120 for setting up or release of one or more SCells. This relates to Action 302. The adaptation is therefore based on and is influenced by the obtained information. The network node 110 may also store the obtained information for several purposes, e.g., use it in future over certain time period for performing adaptation, send this to other nodes as described in a later section. The said adaptation is done to ensure that the disjoint signals which are used by the UE 120 are not missed by the UE 120 due to glitch or interruption which occurs on PCell when one or more SCells are setup or release. In other words the purpose of the adaptation is to ensure that the glitch or interruption does not coincide at least fully with the disjoint signals. Preferably the adaptation is done such that the glitch or interruption does not even coincide partly with the disjoint signals. In order to achieve this objective the network node 110 either sends the command prior to the start of the transmission occasion or after the transmission occasion of the disjoint signals.

More specifically, the said adaptation comprises a method in a network node 110 of sending the SCell setup/release command to the UE 120 after or at least $\Delta T0$ prior to the start of the transmission/measurement/reception occasion of disjoint signals on at least one of the cells, e.g., on Primary Component Carrier (PCC), Secondary Component Carrier (SCC), inter-frequency, inter-RAT carrier. The parameter $\Delta T0$ is larger than at least the sum of the time duration over which the command is received by the UE 120 and the interruption time when UE 120 applies the received command. For example the $\Delta T0$ may be between 10 ms to 30 ms depending upon whether the command requires activation/deactivation or configuration/de-configuration. The latter involves longer value of $\Delta T0$. The network node 110, when adapting the command, also takes into account whether the SCell(s) is activated/deactivated or configured/de-configured. The required value of $\Delta T0$ may also affects the network node 110 decision whether to send the command $\Delta T0$ before the start of the transmission occasion or after the transmission occasion of disjoint signals. For example if the $\Delta T0$ is above a threshold (e.g., 30 ms) then the network node 110 may send the command after the transmission occasion of disjoint signals.

According to another aspect of this embodiment, the adaptation of the SCell command by the network node 110 may also facilitate measurements performed by the network node 110 on disjoint signals sent by the UE 120, e.g., measurements such as uplink received signal quality done by the eNode B on SRS sent by the UE 120 if SRS are not configured infrequently, i.e., not in every subframes (i.e., disjoint signals). Therefore embodiments also apply to the uplink measurements done by the radio node on the disjoint signals sent by the UE 120.

Methods in the UE 120 of Adapting SCell Setup/Release when Performing a Measurement or Receiving Data on Disjoint Signals or Transmitting Disjoint UL Signals This embodiment describes methods, performed in the UE 120, of adapting SCell setup/release when performing a measurement or receiving data on disjoint signals or transmitting disjoint UL signals.

This embodiment may be implemented as standalone or in any combination with one or more of other embodiments in other sections, e.g., generalizations, signaling-related embodiments or network-node related embodiments.

This method enables the UE 120 to adapt the SCell setup/release command, which is received by the UE 120 from the network node 110 (e.g., serving eNode B). The adaptation means that the UE 120 does not always apply the received command immediately upon its reception from the network node 110 or may not start the upcoming measurements and/or data reception on disjoint signals and/or transmission of disjoint UL signals prior applying the command. The purpose of adaptation is to ensure that the disjoint signals used for measurement/data reception by the UE 120 or UE disjoint UL transmissions (e.g., pattern-based which may be expected to be received according to the pattern by another radio node) do not overlap or coincide with the interruption occurring on PCell due to applying the received command. Another effect of the application of the command with a delay is that the SCell setup or release is delayed by a certain margin.

The method in the UE 120 for adapting the SCell setup/release command may also take into account the occurrence of the measurement gaps if they are configured for performing one or more inter-frequency and/or inter-RAT measurements. The purpose of the adaptation is to ensure that the measurement gaps, which typically occur sparsely (e.g., one 6-ms gap every 40 or 80 ms), are not interrupted. The application of the received SCell setup/release command which interrupts the PCell and/or SCell will also result in interruption of the gap if the said received command partially or fully overlaps with the gap.

UE 120 Adaptation Principles

The adaptation of the SCell setup/release command by the UE 120 comprises a method in a UE 120 of applying the received command with a certain delay when disjoint signals transmitted by a cell on which the UE 120 is currently doing at least one measurement or receiving pattern-based data or the UE 120 is transmitting UL disjoint signals (e.g., which may be expected according to a certain pattern by another measurement node). This relates to Action 504. The delay in applying the command will avoid interruption on PCell over the time when the disjoint signals are received or transmitted by the UE 120. This in turn will ensure that the UE 120 does not miss these signals for doing the measurement or receiving the data or transmitting UL disjoint signals measured by another node. More specifically the method in the UE 120 of adapting the command when it is performing at least one measurement on at least one disjoint signals and/or receives pattern-based data and/or transmit UL disjoint signals may e.g. comprise two steps:

Step 1: Receiving a SCell setup/release command or an indication from the serving network node 110. This relates to Action 502.

Step 2:

Adapting SCell setup/release of at least one SCell, the said adaption comprises delaying the SCell setup/release of the at least one SCell by at least $\Delta T1$ with respect to the start of the transmission/measurement/reception occasion of disjoint signals on at least one of the cells (e.g., on PCC, SCC, inter-frequency, inter-RAT carrier), or Adapting measurements on disjoint signals, the said adaptation may comprise delaying the start of upcoming measurements on disjoint signals or extending the measurement time by at least $\Delta T1$ This relates to Action 504.

The value of $\Delta T1$ depends upon at least the interruption time occurring on reception and/or transmission of signals on PCell when UE 120 applies the received command. For example the $\Delta T1$ may be between 10 ms to 30 ms depending upon whether the command requires the UE 120 to perform activation/deactivation or configuration/de-configuration of the SCell. The UE 120 takes into account various factors when adapting the received command, e.g., the type of command, occurrence or periodicity of disjoint signals, density of disjoint signals in a transmission occasion, type of measurements, type of carrier aggregation, etc.

The adaptation of the received SCell setup/release command may be done, e.g., by the UE 120 according to procedures and rules, which are described below:

Autonomously by the UE 120:

Based on a pre-defined rule. For example, a pre-defined rule may allow UE 120 to adapt the received command. The adaptation may also be allowed for certain type of command, e.g., only for deactivation and/or de-configuration of SCell(s). This is because activation and/or configuration should preferably be done by the UE 120 more quickly so that UE 120 can receive the data on SCell as fast as possible.

For example UE 120 may adapt the command depending upon the type of Carrier Aggregation (CA), e.g., only for intra-band CA.

In another example the UE 120 may adapt the command only if it has a receiver and/or transmitter configuration which causes interruption when it applies the received command. For instance if the UE 120 may have a single receiver for certain type of carrier aggregation (e.g., for 2 carriers in case of intra-band) then it may apply the command.

Received indicator or message from a network node 110. For example the network node 110 may configure the UE 120 that when it receives a command the UE 120 may apply it with certain delay to avoid the occurrence of interruption overlapping with disjoint signals.

Combination of pre-defined rule and network configuration. For example:

A pre-defined rule may define the maximum allowed delay in applying a received command by the UE 120 after reception of the command, type of disjoint signals for which the delaying of command is allowed.

The UE 120 may only apply the command with certain delay for certain disjoint signals when permitted by the network node 110. For example the network node 110 may pre-configure the UE 120 or allow it when sending the SCell setup/release command. This relates to Action 504.

Informing the Network about the Adaptation

After adapting the command, the UE 120 may also inform the network node 110 that it has adapted one or more received SCell setup/release command, especially if the adaptation is done by the UE 120 autonomously. The information reported by the UE 120 to the network node 110 may comprise one or more of:

whether UE 120 has applied the command with certain delay;

type of command which has been applied with a delay, e.g., command related to deactivation of Scell, de-configuration of SCell;

amount of delay with which a particular command is applied with a delay;

measurement(s) due to which the adaptation is done; and one or more set of disjoint signals on which measurement(s) were being done when the received command was applied with certain delay.

Impact on Pre-Defined Requirements Due to Adaptation of Received Command

The UE 120 is required to meet one or more pre-defined requirements related to a measurement performed on disjoint signals. Examples of pre-defined requirements are: measurement accuracy, measurement period over which accuracy is to be met, measurement reporting delay, evaluation periods, cell identification reporting delay, number of cells over which measurement is done over measurement period etc. For example RSTD measurement has to meet certain accuracy for each PRS bandwidth over certain measurement period etc.

According to this embodiment, when the UE 120 adapts the received SCell setup/release command to prevent the overlapping of the interruption with the disjoint signals on which the UE 120 is performing measurement(s), then the UE 120 has to meet the first set of pre-defined requirements related to the said measurement(s) performed on the said disjoint signals. The first set of pre-defined requirements is related to a measurement performed by the UE 120 over a time period during which all disjoint signals are available to the UE 120 for this measurement (e.g., as if no SCell command is applied). This pre-defined rule related to meeting first set of pre-defined requirements may be defined in the standard and may be verified, e.g., by sending SCell command, to ensure that the UE 120 adapts the command when performing measurement(s) on disjoint signals.

Method in the UE 120 of Meeting Pre-Defined Requirements when Setup/Release of SCell Coincides with Transmission/Reception Occasion of Disjoint Signals Used for a DL Measurement or Pattern-Based Data Reception or for UL Transmission of Disjoint Signal This embodiment describes methods, performed in the UE 120, of meeting pre-defined requirements when setup/release of SCell coincides with transmission/reception occasion of disjoint signals used for a DL measurement or pattern-based DL data reception or for UL transmission of disjoint signals measured by a radio network node 110.

This embodiment may be implemented as standalone or in any combination with one or more of other embodiments in other sections, e.g., generalizations, signaling-related embodiments or network-node related embodiments.

According to this embodiment, neither the network node 110 nor the UE 120 adapts the SCell setup/release command. This may result in the UE 120 not being able to receive the disjoint signals at one or more occasions when performing measurement or receiving data on these disjoint signals or transmitting UL disjoint signals. This will adversely affect the performance of the measurements performed by the UE 120. For example, the UE 120 may not meet any of the pre-defined requirements. This means the related function for which the measurements are being done in DL and/or UL (e.g., positioning, SON, mobility) or data are being received (e.g., system information, MBMS, SPS-based data) will be partly or fully disrupted. Therefore according to this embodiment if one or more occasions of the disjoint signals are at least partly affected (e.g., signals missed or not received by the UE 120) due to the application of the received SCell setup/release command, then the UE 120 meets a second set of pre-defined requirements related to the measurement(s) performed or data received on the said disjoint signals. The first set of pre-defined requirements is to be met by the UE 120 when none of the disjoint signals is affected over a time period during which the UE 120 performs measurement or receives data on the said disjoint signals.

When the UE 120 transmits disjoint signals measured by another node, then the measurement requirements by the radio node performing measurements on these signals may be based on the assumption that the UE 120 behaves as described above, e.g., adapts the SCell setup/release to ensure that the measurements performed by the radio node meet a third set of requirements (the third and the second set of requirements may be even related in some examples, e.g., for two-directional measurements).

More specifically, this embodiment discloses a method in a UE 120 of meeting a second set of pre-defined requirements if at least one SCell setup command/release partly or fully coincides with at least one transmission/reception/measurement occasion of disjoint signals used for performing measurements or receiving data on at least one measured cell otherwise the UE 120 meets the first set of pre-defined requirements.

Examples of pre-defined requirements as expressed earlier are: measurement accuracy, measurement period over which accuracy is to be met, measurement reporting delay, evaluation periods, cell identification reporting delay, number of cells over which one or more measurement is done over a measurement period, UE 120 performance requirements (e.g., demodulation or CSI requirements), MBMS requirements, system information reading requirements, UE 120 requirements related to measurements performed in gaps etc.

According to another aspect of this embodiment, one or more second set of pre-defined requirements may be more relaxed than the corresponding first set of pre-defined requirements. For example, the second set of measurement period may be longer than the first set of measurement period for the same type of measurement. However, some of the requirements may be the same, e.g., second set and first set of measurement accuracies may be the same. A longer second set of measurement period may also depend upon one or more factors such as the type of disjoint signals used for measurement, type of measurement (e.g., intra-frequency, inter-frequency), the number of SCell setup/release commands received over the measurement period, number of SCell setup/release commands at least coinciding with the number of occasions of the transmission of the disjoint signals etc.

One or more rules may be pre-defined to ensure that the UE 120 meets at least second set of requirements. For example it may be pre-defined that if the UE 120 is performing a measurement (e.g., RSTD) on disjoint signals (e.g., PRS) and the UE 120 receives SCell setup/release command then the measurement period of the said measurement (e.g., RSTD) is extended by certain margin. In another example it may be pre-defined that if the UE 120 is performing a measurement (e.g., RSTD) on disjoint signals (e.g., PRS) and the UE 120 receives SCell setup/release command then the measurement period of the said measurement (e.g., RSTD) is extended and the extended measurement period (i.e., second set) is expressed as follows:

$$\text{Second pre-defined period}(T3) = \text{first pre-defined period}(T2) + K^* \text{disjoint signals' occasions} + \delta$$

where K is the number of times the SCell setup/release occurs during T3 and δ (δ≥0; it can be zero as special case) is an extra margin to account for factors such as processing in the UE 120.

The above rules may apply to requirements pertaining to intra-frequency, inter-frequency, carrier aggregation/multi-carrier or inter-RAT measurements.

In order to meet the above mentioned requirements the UE 120 may be required to implement additional circuitry such as memory unit, processing unit and control unit.

Method in the UE 120 of Reporting its Capability Related to Adaption of SCell Setup/Release of SCell when Performing a Measurement or Receiving Data on Disjoint Signals or Transmitting UL Disjoint Signals This embodiment may be implemented as standalone or in any combination with one or more of other embodiments in other sections, e.g., generalizations, signaling-related embodiments in general described herein, UE 120-related or network-node related embodiments.

All UEs may not be capable of adapting the received SCell setup/release command to avoid the collision with the disjoint signals on which the UE performs measurements and/or received data or when the UE transmits disjoint signals. Therefore according to this embodiment the method implemented in the UE 120 comprises signaling its capability to the network node 110 (e.g., eNode B, positioning node, core network node 110 etc.), that it is capable of adapting the SCell setup/release of at least one SCell when performing a measurement and/or receiving data on disjoint signals or transmitting UL disjoint signals.

This relates to Action 301 and 501.

Additional Information Associated with UE 120 Capability

The capability information may contain additional information. Examples of additional information are any combination of:

The type of SCell setup/release command which can be adapted. For example a UE 120 may indicate that it can adapt only activation and deactivation of SCell.

The disjoint signals for which adaptation can be done. For example a UE 120 may indicate that it may adapt the command when measuring on PRS, PBCH/D-BCH, inter-frequency and/or inter-RAT measurements using measurement gaps etc.

The type of measurements for which adaptation can be done. For example a UE 120 may indicate that it may adapt the command when measuring RSTD, acquiring SI of a cell etc.

The UE 120 may also indicate whether it can adapt the command on intra-frequency, inter-frequency and carrier aggregation measurements.

The UE 120 may indicate that it can adapt the command provide certain type of carrier aggregation is used, e.g., intra-band carrier aggregation.

UE Capability Reporting Mechanisms

The UE 120 may send the capability information to the network node 110 in any of the following manner:

Proactive reporting without receiving any explicit request from the network node 110, e.g., serving or any target network node 110;

Reporting upon receiving any explicit request from the network node 110, e.g., serving or any target network node 110;

The explicit request may be sent to the UE 120 by the network node 110 anytime or at any specific occasion. For example the request for the capability reporting can be sent to the UE 120 during initial setup or after a cell change, e.g., handover, RRC connection re-establishment, RRC connection release with redirection, PCell change in CA, PCC change in PCC etc.

In case of proactive reporting the UE 120 may report its capability during one or more of the following occasions:

During initial setup or call setup, e.g., when establishing the RRC connection

During cell change, e.g., handover, primary carrier change in multi-carrier operation, PCell change in multi-carrier operation, RRC re-establishment, RRC connection Use of Received Capability Information for Network Operational Tasks The receiving network node 110 may use the received capability information for various network operational tasks. According to one example the capability information received by the network node 110 may be signaled to another node, e.g., to another UE 120 in Device to Device (D2D) communication mode, radio network node, core network node, positioning node. These nodes may use this information for example after cell change. Therefore the UE 120 may not have to again signal its capability to the network after the cell change. The network such as the node 110 may also decide to re-configure the parameters related to certain type of measurements performed on disjoint signals, e.g., carrier frequency on which the measurement is to be done, adaptation of one or more parameters related to measurement gaps such as changing or using measurement periodicity better adapted to the frequency of SCell setup/release command. For example if SCell setup/release command is sent more frequently by the network (e.g., once every 20-40 ms) then the gaps with longer periodicity (e.g., 80 ms periodicity instead of 40 ms) can be configured by the network to minimize the probability of interruption of measurement gap. The network such as the network node 110 may also decide whether it should adapt the SCell command or not when UE 120 performs certain type of measurements on disjoint signals.

Method in Network Node 110 of Forwarding the Information Related to Adaptation SCell Setup/Release to Other Nodes for Network Operational Tasks This embodiment may be implemented as standalone or in any combination with one or more of other embodiments in other sections, e.g., generalizations, signaling-related embodiments in general described herein, UE 120-related or network-node related embodiments.

The network node 110 may signal the information related to the adaptation of the SCell setup/release command to another network node 110, which may use the received information for one or more network operational tasks. The main objective of these tasks is to achieve one or more of: improve network operation, facilitate UE 120 measurements on disjoint signals, improve network performance and/or UE 120 measurement performance etc.

The information may be collected by the network itself, e.g., if network node 110 applies the adaptation, based on received information from the UE 120, based on any other means (e.g., information about the pre-defined requirements met by the UE 120), etc., as described above. The information may comprise one or more parameters related to the adaptation of the SCell command as described above, e.g., type of commands which are adapted, whether command was sent with a delay or applied earlier than the start of disjoint signals' transmission occasions, amount of delay with which the command is sent to the UE 120 or applied by the UE 120, etc.

Examples of other nodes are eNB, relay, radio base station, network controller, RNC, Node B, SON node, MDT node, Operations & Maintenance (O&M), Operation Support System (OSS) node, positioning node, core network node 110, etc.

Examples of network operational tasks are in general: network planning, tuning of parameters, improving network performance, adaptation of SCell command in one or more cells in the network etc. More specifically, the tasks may comprise of configuration of disjoint signals such as their periodicity, number of signals (e.g., PRS subframes) in an occasion, configuration of maximum number of measurements done on disjoint signals in parallel, adjustment or tuning of radio network parameters and/or other parameters related to disjoint signals, e.g., output power of disjoint signals and/or radio network node 110, bandwidth of disjoint signals and/or radio network node 110, etc.

Methods in Test System for Verifying the Procedures and Pre-Defined Requirements This embodiment may be implemented as standalone or in any combination with one or more of other embodiments described above.

The methods described in the embodiments in preceding sections may also be configured in a Test Equipment (TE) node (also known as System Simulator (SS) or Test System (TS). The TE or SS will have to implement all configuration methods related to transmit power adjustment to be able to configure the UE 120 and/or the network node 110 for the test.

The purpose of the test is to verify that the UE 120 is compliant to the pre-defined rules, protocols, signaling and requirements associated with the transmit power adjustment described herein.

The tests are also performed to verify the radio network node 110 requirements, signaling, protocol and procedures associated with the transmit power adjustment described herein.

Typically the TE or SS or TS separately performs tests for UEs and radio network nodes.

The testing may be measurement-specific and may be capability-dependent. For example, requirements described above may be verified with such TE or SS. For example, if the method in the network node 110 of delaying the SCell command is verified then the test equipment will have to be capable of sending SCell command with certain delay to avoid collision with the disjoint signals. As another example, if the method in the UE 120 of delaying the SCell command is verified then the test equipment will have to be capable of verifying that the desired pre-defined UE 120 performance requirements are met.

For UE 120 testing, the TE or SS will also be capable of receiving the UE 120 measurement and/or data performance results associated with the SCell command adaptation; and analyzing the received results, e.g., comparing the with the reference results. The reference can be based on the pre-defined requirements or UE 120 behavior or theoretical estimate or performed by a reference device. The reference device can be part of TE or SS.

For the testing (also known as conformance testing) of radio network node 110, e.g. eNode B, relay, base station etc., the TE or SS will also be capable of: distinguishing and interpreting the SCell command sent in normal way or with certain delay when certain disjoint signals are transmitted for measurements by the UE 120; and receiving and analyzing the received results from UE 120, e.g., comparing the received results with the reference results. The reference may be based on the pre-defined requirements or theoretical estimate or performed by a reference device. The reference device can be part of TE or SS.

Method in a Network Node 110 of Reporting its Capability Related to Adapting SCell Setup/Release Command This embodiment may be implemented as standalone or in any combination with one or more of other embodiments in other sections, e.g., generalizations, signaling-related embodiments in general described herein (including related to UE 120 capability), UE 120-related or network node 110 related embodiments.

All radio network nodes may not be capable of adapting the SCell setup/release command to avoid the collision with the disjoint signals on which the UE 120 performs measurements and receives data or when the radio network node 110 s are performing measurements or receive data on disjoint UL signals transmitted by the UE 120. Therefore, according to this embodiment the method implemented in a radio network node 110 comprises signaling its capability to another network node (e.g., eNode B, positioning node, core network node 110, etc.), that it is capable of adapting the SCell setup/release command for at least one SCell for a UE 120 performing a measurement and/or receiving data on disjoint signals or transmitting disjoint UL signals.

This radio network node 110's capability may also be signaled to the UE 120. This may be used to coordinate the adaption at both sides or ensure that at least one side is performing the adaptation. For example, when the radio network node 110's capability indicates that the node cannot adapt the SCell setup/release commands, then the UE 120 may perform the adaption (if it is capable of doing so); otherwise the UE 120 may respond with that its capability does not support the adaption.

Method in a Network Node 110 Adaptively Configuring at Least One Transmit and/or Measurement Pattern This embodiment may be implemented as standalone or in any combination with one or more of other embodiments in other sections, e.g., generalizations, signaling-related embodiments in general described herein, UE 120-related or network-node related embodiments.

According to this embodiment, the network node 110 (e.g., radio network node 110, such as eNodeB, or a positioning node or MDT node or SON node) adaptively configures at least one transmit and/or measurement pattern and/or measurement gap pattern and/or scheduling pattern related to disjoint signals accounting for at least a possible interruption impact (e.g., on PCell or any SCell, in DL or UL) which may be caused by SCell setup/release, and in some examples accounting also for at least one of:

the UE 120 capability to meet the second set of pre-defined requirements (as described above), and the node's capability to adaptively configure SCell setup/release command.

The network node 110 adaptively configuring a pattern is not necessarily the same as the node sending SCell setup/release command. In case these are different nodes, some coordination may be used between the two nodes, e.g.:

The network such as the network node 110 configuring a pattern receives (upon a request or in an solicited way) the information about UE 120 capability or the capability of the node configuring or sending the SCell setup/release command, and based on the received information configures at least one pattern.

The adapted pattern may be signaled to the UE 120, another radio network node 110 (e.g., neighbor eNodeB or LMU) or another network node (e.g., positioning node).

Advantages of Embodiments Herein

Embodiments herein present numerous advantages over the prior art. The activation, deactivation, configuration or de-configuration of SCell can be performed without adversely affecting the measurements performed by the UE 120 on signals which are infrequently available to the UE 120. Also, there is a guarantee that the UE 120 meets all performance requirements of measurements done on disjoint signals, even if the SCell command partly or fully affects the signals on which UE 120 measurement is done. Finally, the network node 110 may use the UE 120 reported statistics related to the adaptation of the SCell command to improve the network planning and tune network operational parameters to improve network operation, facilitate UE 120 measurements on disjoint signals, etc.

Definitions

As used herein, the terms "wireless device" and "user equipment" or "UE" might in some cases refer to mobile devices such as mobile telephones, personal digital assistants, handheld or laptop computers, and similar devices that have telecommunications capabilities. Such a UE 120 might consist of a UE such as the UE 120 and its associated removable memory module, such as but not limited to a Universal Integrated Circuit Card (VICC) that includes a Subscriber Identity Module (SIM) application, a Universal Subscriber Identity Module (VSIM) application, or a Removable User Identity Module (R-UIM) application. Alternatively, such a UE might consist of the device itself without such a module. In other cases, the term UE might refer to devices that have similar capabilities but that are not transportable, such as desktop computers, set-top boxes, or network appliances. The term UE may also refer to any hardware or software component that can terminate a communication session for a user. Note that even some radio network node 110 s, e.g., femto BS (also known as home BS), may also be equipped with a UE 120-like interface.

A radio node is characterized by its ability to transmit and/or receive radio signals and it comprises at least a transmitting or receiving antenna. A radio node may be a UE such as the UE 120 or a radio network node such as the radio network node 110. Some examples of radio nodes are a radio base station (e.g., eNodeB in LTE or NodeB in UTRAN), a relay, a mobile relay, remote radio unit (RRU), remote radio head (RRH), a sensor, a beacon device, a measurement unit (e.g., Location Measurement Units (LMUs) user equipment, Personal Digital Assistants (PDA), mobile, iPhone, laptop, etc.

A radio network node such as the radio network node 110 is a radio node comprised in a radio communications network and typically characterized by own or associated network address. For example, a user equipment in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g., an example dual-mode UE 120 may operate with any one or combination of WiFi and LTE or HSPA and LTE/LTE-A). A radio network node such as the radio network node 110, including eNodeB, RRH, RRU, or transmitting-only/receiving-only nodes, may or may not create own cell. It may also share a cell with another radio node which creates own cell. More than one cell may be associated with one radio node. Further, one or more serving cells (in DL and/or UL) may be configured for a UE 120, e.g., in a carrier aggregation system where a UE 120 may have one Primary Cell (PCell) and one or more Secondary Cells (SCells).

A network node 110 may be any radio network node 110 or core network node 110. Some non-limiting examples of a network node 110 are an eNodeB, RNC, positioning node, Mobility Management Entity (MME), Public Safety Answering Point (PSAP), SON node, MDT node, (typically but not necessarily) coordinating node, and O&M node.

A positioning node described in different embodiments is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. Positioning functionality may also be split among two or more nodes, e.g., there may be a gateway node between LMUs and E-SMLC, where the gateway node may be a radio base station or another network node 110; in this case, the term "positioning node" may relate to E-SMLC and the gateway node. In a testing environment, a positioning node may be simulated or emulated by test equipment.

The term "coordinating node" used herein is a network and/or node, which coordinates radio resources with one or more radio nodes. Some examples of the coordinating node are network monitoring and configuration node, OSS node, O&M, MDT node, SON node, positioning node, MME, a gateway node such as Packet Data Network Gateway (P-GW) or Serving Gateway (S-GW) network node 110 or femto gateway node, a macro node coordinating smaller radio nodes associated with it, eNodeB coordinating resources with other eNodeBs, etc.

The UE 120, network node 110, radio network node 110, positioning node, and/or coordinating node will generally include at least one of: communication circuitry operative to exchange data with other network node 110 s over a wired or optical interface; and radio circuitry (and antenna) operative to exchange data with one or more other network node 110 s over the air interface of a wireless communication system. Such nodes will also generally include memory operative to store, and a processor operative to execute, software instructions implementing the functionality of one or more embodiments described herein.

Of course, some such nodes may include additional circuits and features appropriate to its functionality. For example, a UE 120 may also include a user interface (display, touchscreen, keyboard or keypad, microphone, speaker, and the like), a camera, removable memory interfaces, a short-range communication interface (Wi-Fi, Bluetooth, and the like), wired interface (USB), and the like. In particular, a UE 120 may be mobile, and include a replaceable or rechargeable battery. Similarly, a positioning node may include circuits operative to receive and process satellite positioning signals. Such features are familiar to those of skill in the art, are not directly germane to a description of embodiments herein, and are not further elaborated herein.

In all embodiments, the processor may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory may comprise any non transient machine-readable media known in the art or that may be developed, including but not limited to magnetic media (e.g., floppy disc, hard disc drive, etc.), optical media (e.g., CD-ROM, DVD-ROM, etc.), solid state media (e.g., Static Random Access Memory (SRAM), Dynamic Random Access Memory (DRAM), Double Data Random Access Memory (DDRAM), Read-Only Memory (ROM), Programmable Read-Only Memory (PROM), Erasable Programmable Read-Only Memory (EPROM), Flash memory, etc.), or the like.

In all embodiments, the radio circuitry may comprise a transceiver used to communicate with one or more other transceivers over a Radio Access Network according to one or more communication protocols known in the art or that may be developed, such as IEEE 802.xx, CDMA, WCDMA, GSM, LTE, WiMax, or the like. The transceiver implements transmitter and receiver functionality appropriate to the Radio Access Network links (e.g., frequency allocations and the like). The transmitter and receiver functions may share circuit components and/or software, or alternatively may be implemented separately.

In all embodiments, the communication circuitry may comprise a receiver and transmitter interface used to communicate with one or more other nodes over a communication network according to one or more communication protocols known in the art or that may be developed, such as Ethernet, TCP/IP, SONET, ATM, or the like. The communication circuitry implements receiver and transmitter functionality appropriate to the communication network links (e.g., optical, electrical, and the like). The transmitter and receiver functions may share circuit components and/or software, or alternatively may be implemented separately.

The signaling described in the embodiments herein is either via direct links or logical links (e.g., via higher layer protocols and/or via one or more network and/or radio nodes). For example, signaling from a coordinating node may pass another network node, e.g., a radio network node.

The term "disjoint signals" applied for DL signal/channel transmissions used in the embodiments refer to any signals which are not transmitted in DL by a radio node (e.g., eNodeB) or received in DL by a radio node (e.g., UE 120) in every downlink subframe over a certain time period (T0) and/or indicated by a pattern indicating occasions at least some of which are disjoint. The term "disjoint signals" applied for UL signal/channel transmissions used in the embodiments refer to any signals which are not transmitted in UL by a radio node (e.g., UE 120) or received by a radio node (e.g., eNodeB or LMU) in every uplink subframe over a certain time period (T0) and/or indicated by a pattern indicating occasions at least some of which are disjoint. A time period may be a duration over which the UE 120 performs one or more measurements. Such disjoint signals may be transmitted or measured according to a pattern in one or more consecutive downlink subframes but not in all downlink subframes over T0.

Examples of DL disjoint signals are PRS, broadcast related signals (e.g., system information in general, PBCH, D-BCH etc.), pattern-based data transmissions (e.g., MBMS data or SPS-based data), synchronization signals (e.g., PSS, SSS etc.), physical signals in new carrier type (e.g., CRS with reduce periodicity such as once every 5 or 10 ms), UE 120 specific reference signals (e.g., Demodulation Reference Signal (DM-RS)), Multi-Media Broadcast over a Single Frequency Network Reference Signal (MBSFN RS), Random Access Channel Random Access Response (RACH RAR) (ack RACH response message), Physical Hybrid Indication Channel (PHICH) comprising UL Hybrid automatic repeat request (HARQ) feedback (the feedback is typically transmitted according to a corresponding pattern for synchronous HARQ, and UL HARQ is a synchronous process), etc. Some examples of UL disjoint signals are SRS (SRS may be described by a UE specific SRS configuration comprising a pattern of disjoint UL transmit occasions or even by a cell-specific SRS subframe configuration pattern comprising disjoint time instances describing UL SRS transmissions of multiple UE 120 in the cell), RACH, etc.

Some examples of patterns are
- a DL or an UL transmit pattern, e.g., PRS pattern, Primary and Secondary synchronization signals (PSS & SSS) pattern, ABS pattern with no data transmissions, ABS pattern with data transmissions at a reduced power, PRS muting pattern, system information, MBSFN pattern, SRS configuration, SRS subframe configuration, RACH, RACH RAR, pattern indicating disjoint transmissions for a non-full duplex mode (e.g., for HD-FDD), etc.
- a measurement pattern for DL and/or UL measurements, e.g., DL measurement resource restriction pattern for eICIC, UL measurement resource restriction pattern for eICIC, DL low-interference subframe pattern in general, UL low-interference subframe pattern in general (see, e.g., as described in provisional application U.S. 61/522,810), CSI pattern for eICIC, measurement gap pattern, autonomous gap configuration, etc. Some non-limiting measurement examples include
    - DL measurements: RSRP, RSRA, direction measurements on DL signals, time of arrival on DL signals, time difference of arrival on DL signals;
    - UL measurements: timing measurements on UL signals, power measurements on UL signals, direction measurements on UL signals (e.g., AoA), time of arrival on UL signals, time difference of arrival on UL signals; and
    - two-directional measurements: timing advance, RTT, UE 120 Rx-Tx, eNodeB Rx-Tx.
- a data scheduling pattern for UL or DL transmissions, e.g., Multimedia Broadcast Multicast Services (MBMS) configuration, subframe configuration for SPS-based data, UL HARQ transmissions which are typically transmitted according to a pre-defined pattern, etc. In some embodiments, a scheduling pattern is used interchangeably with a transmit pattern, since it may indicate when data are scheduled and transmitted. In some embodiments, data scheduling is also associated with transmitting control channels following the data transmissions (e.g., Physical Downlink Control Channel (PDCCH), Physical Control Format Indicator Channel (PCFICH), Physical Hybrid-ARQ Indicator Channel (PHICH), Physical Uplink Control Channel (PUCCH), e.g.,), since some control channels need to be transmitted in the same subframes when data are transmitted.

Note that at least in some embodiments, a transmit pattern may be indirectly indicating measurement occasions since it may indicate the presence or absence of the signals to be received/measured.

Herein, signal and channel are used interchangeably, e.g., receiving data on a radio signal may be used interchangeably with receiving a data channel.

Disjoint DL signals in TDD may comprise DL signals not comprised in every DL subframe. Disjoint UL signals in TDD may comprise DL signals not comprised in every UL subframe. In one example, HD FDD may be viewed in the time domain similar to TDD, e.g., a radio node (e.g., a UE 120) may not receive radio signals in DL and transmit radio signals in UL at the same time.

The term "SCell setup/release" used in the embodiments refer to any command, signaling message, indicator, information element (IE), control element (CE), etc., which is sent by the network node 110 to the carrier aggregation UE 120 to activate, deactivate, configure or de-configure (or un-configure) one or more SCells. More specifically, SCell setup may refer to activation or configuration of SCell, whereas SCell release may refer to deactivation or de-configuration of SCell. The SCell can be in uplink, downlink or both directions.

Although described in the context of LTE and HSPA, the embodiments of the embodiments herein are not limited to these systems, but may be advantageously employed with any Radio Access Network (RAN), single-RAT or multi-RAT. Some other RAT examples are LTE-Advanced, UMTS, HSPA, GSM, cdma2000, WiMAX, and WiFi.

The embodiments herein may, of course, be carried out in other ways than those specifically set forth herein without departing from essential characteristics of the embodiments herein. The present embodiments are to be considered in all respects as illustrative and not restrictive, and all changes coming within the meaning and equivalency range of the appended claims are intended to be embraced therein.

Some embodiments herein relate to a method in the network node 110 of sending SCell setup/release commands to a multi-carrier capable UE performing a measurement (e.g., positioning measurement, RSTD, System Information (SI) acquisition or at least one pattern-based measurement in general) or receive data on disjoint signals. The method comprises
- obtaining information that the radio node (e.g., UE or radio network) is doing a measurement or receives data on disjoint DL and/or UL signals;
- adaptively configuring the SCell setup/release command based on the obtained information, wherein the said adaptation comprises sending the command after or at least $\Delta T0$ prior to the start of one of:
    - the DL transmission occasion of disjoint signal and/or DL measurement occasion and/or DL data reception on disjoint signals on at least one of the cells (e.g., on PCC, SCC, inter-frequency, inter-RAT carrier); or
    - the UL transmission occasion of disjoint signals on at least one of the cells (e.g., on PCC, SCC, inter-frequency, inter-RAT carrier); or the UL measurement occasion or UL data reception occasion comprising disjoint signals on at least one of the cells (e.g., on PCC, SCC, inter-frequency, inter-RAT carrier)

wherein the said SCell setup/release command is at least one of SCell activation, SCell deactivation, SCell configuration and SCell de-configuration, and the said disjoint signals are respectively for DL and UL:

the signals which are not transmitted in every downlink subframe (e.g., PRS, system information, SPS data, MBMS data, data in low-interference subframes for eICIC, "sparse" CRS or other physical signals in NCT, etc.) and/or not indicated for measurements in every downlink subframe (e.g., CRS measured in restricted measurement subframes for eICIC); or the signals which are not transmitted in every uplink subframe (e.g., SRS, RACH, UL HARQ, etc.) and/or not indicated for measurements in every uplink subframe (e.g., SRS measured selectively in restricted UL measurement subframes but not always when SRS is available).

Some other embodiments herein relate to a method in a UE of performing a measurement on a disjoint signal, the method comprises:

receiving a SCell setup/release command from the serving radio node, the said SCell setup being at least one of SCell activation, SCell deactivation, SCell configuration and SCell de-configuration;

adapting SCell setup/release of at least one SCell, the said adaption comprising delaying the SCell setup/release of the at least one SCell by at least $\Delta T1$ with respect to the start of the DL transmission occasion and/or DL measurement occasion and/or DL data receive occasion of disjoint signals on at least one of the cells, e.g., on PCC, SCC, inter-frequency, inter-RAT carrier; and/or the start of the UE UL transmission of disjoint signals on at least one of the cells, e.g., on PCC, SCC, inter-frequency, inter-RAT carrier; and/or the start of the UL measurement on disjoint UE signals on at least one of the cells, e.g., on PCC, SCC, inter-frequency, inter-RAT carrier.

wherein the adaptation is based on a pre-defined rule and/or indication received from the network node 110 or is autonomous.

Still another embodiment relates to method in a UE of meeting a second set of pre-defined requirements if at least one SCell setup command/release partly or fully coincides with at least one of:

a DL transmission and/or DL measurement occasion and/or DL data reception occasion of disjoint signals; and/or UE UL transmission of disjoint signals; and/or UL measurement occasion and/or UL data reception occasion of disjoint UE signals;

that are used for performing measurements on at least one measured cell, otherwise the UE meets the first set of pre-defined requirements.

Yet other embodiments herein relate to a method in the UE 120 of signaling its capability to the network node 110 (e.g., eNode B, positioning node), that it is capable of adapting the SCell setup/release of at least one SCell when performing a measurement or data reception on disjoint signals or transmitting in UL or measurement occasions on disjoint UL signals.

Yet other embodiments herein relate to a method in the network node 110 of reporting its capability related to adapting SCell setup/release command.

Yet other embodiments herein relate to a method in the network node 110 of adaptively configuring at least one transmit and/or measurement and/or scheduling pattern (e.g., positioning occasions, PRS transmit pattern or PRS muting pattern, measurement resource restriction pattern, data pattern) accounting for at least the possible interruption impact (e.g., on PCell or any SCell, in DL or UL) which may be caused by SCell setup/release, accounting also for at least one of:

the UE capability to meet a second set of pre-defined requirements; and the node's capability to adaptively configure SCell setup/release command;

wherein the network node 110 adaptively configuring a pattern is not necessarily the same as the node sending SCell setup/release command.

ABBREVIATIONS

3GPP 3$^{rd}$ Generation Partnership Project
BS Base Station
CRS Cell-specific Reference Signal
DL Downlink
eNodeB evolved Node B
E-SMLC Evolved SMLC
IE Information Element
LTE Long-Term Evolution
MDT Minimization of Drive Tests
PCI Physical Cell Identity
RF Radio Frequency
RRC Radio Resource Control
RSRP Reference Signal Received Power
RSRQ Reference Signal Received Quality
RSSI Received Signal Strength Indicator
SINR Signal-to-Interference Ratio
SON Self-Optimized Network
SRS Sounding Reference Signals
UE User Equipment
UL Uplink
UMTS Universal Mobile Telecommunications System
UTDOA UL Time Difference of Arrival

The invention claimed is:

1. A method in a network node for adapting a Secondary cell, SCell, command to a user equipment, UE, the SCell command is one of a setup and release command, the method comprising:

adapting the SCell command by one of advancing and delaying the timing of sending said SCell command with respect to a start of a transmission of disjoint signals on which the UE is performing a measurement, the disjoint signals are signals that are not used, by the UE, for performing the measurement in every subframe.

2. The method according to claim 1, further comprising: receiving from the UE, information related to the capabilities of the UE to adapt the SCell command when the UE performs the measurement of downlink disjoint signals; and wherein adapting the Scell command by one of advancing and delaying timing of sending said command is further based on information received from the UE.

3. The method according to claim 2, wherein the received information further comprises information related to the disjoint signals on which the UE is capable of adapting the Scell command.

4. The method according to claim 1, wherein one of the SCell setup and release command is at least one of SCell activation, SCell deactivation, SCell configuration and SCell de-configuration.

5. The method according to claim 1, further comprising: adaptively configuring at least one of: a transmit pattern, a measurement pattern, and scheduling pattern accounting for the SCell setup or release.

6. The method according to claim 1, further comprising: Signaling the network node's capability to at least one of the UE and another network node, the network node's capability comprises the capability of adaptively configuring the Scell command when the UE performs the measurement on downlink disjoint signals.

7. A method in a User Equipment, UE, for adapting one of a Secondary Cell, SCell, setup and release, the UE being served by a network node, the method comprising:
receiving one of an SCell setup and release command from the network node; and
adapting one of the SCell setup and release by delaying the timing of applying the command to at least partly avoid collision with a transmission of disjoint signals on which the UE is performing a measurement, the disjoint signals are signals that are not used, by the UE, for performing the measurement in every subframe.

8. The method according to claim 7, wherein the SCell setup is at least one of SCell activation, SCell deactivation, SCell configuration and SCell de-configuration.

9. The method according to claim 7, wherein the UE is required to meet a first set of pre-defined requirements related to the measurement performed on the disjoint signals when adapting one of the SCell setup and release to avoid the collision.

10. The method according to claim 7, wherein the UE is required to meet a first set of pre-defined requirements related to the measurement performed on the disjoint signals when adapting one of the SCell setup and release to avoid the collision.

11. The method according to claim 7, further comprising: signaling to the network node that the UE has capability to adapt the one of SCell setup and release of the SCell when the performs a measurement on downlink disjoint signals.

12. The method according to claim 7, further comprising: receiving, from the network node, the network node's capability to adaptively configure SCell command when the UE performs a measurement on downlink disjoint signals.

13. A network node for adapting a Secondary cell, SCell, command to a user equipment, UE, the SCell command is one of a setup and release command, the network node comprising:
a processor configured to adapt the Scell command by one of advancing and delaying the timing of sending said Scell command with respect to a start of a transmission of disjoint signals on which the UE is performing a measurement, the disjoint signals are signals that are not used, by the UE, for performing the measurement in every subframe.

14. The network node according to claim 13, further comprising:
a communication circuitry configured to receive from the UE, information related to the capabilities of the UE to adapt the Scell command when the UE performs the measurement of downlink disjoint signals; and
wherein the processor is further configured to adapt the Scell command by one of advancing and delaying the timing of sending the Scell command based on the information received from the UE.

15. The network node according to claim 14, wherein the information to be received further comprises information related to the disjoint signals on which the UE is capable of adapting the Scell command.

16. The network node according to claim 13, wherein one of the SCell setup and release command is at least one of SCell activation, SCell deactivation, SCell configuration and SCell de-configuration.

17. The network node according to claim 13, wherein the processor is further configured to adaptively configure at least one of: a transmit pattern, a measurement pattern, and scheduling pattern accounting for at least one of the SCell setup and release.

18. The network node according to claim 13, wherein the communication circuitry is further configured to signal the network node's capability to at least one of the UE and another network node, the network node's capability comprises the capability of adaptively configuring the Scell command when the UE performs the measurement on downlink disjoint signals.

19. A User Equipment, UE, for adapting one of an Secondary Cell, SCell, setup and release, the UE being configured to be served by a network node, the UE comprising:
a communication circuitry configured to receive one of an SCell setup and release command from the network node; and
a processor configured to adapt one of the SCell setup and release by delaying the timing of applying the SCell command to at least partly avoid collision with a transmission of disjoint signals on which the UE is performing a measurement, the disjoint signals are signals that are not used, by the UE, for perform the measurement in every subframe.

20. The UE according to claim 19, wherein the SCell setup is at least one of SCell activation, SCell deactivation, SCell configuration and SCell de-configuration.

21. The UE according to claim 19, wherein the UE is configured to be required to meet a first set of pre-defined requirements related to the measurement performed on the disjoint signals when adapting one of the SCell setup and release to avoid the collision.

22. The UE according to claim 19, wherein the UE is configured to be required to meet a second set of pre-defined requirements related to the measurement performed on the disjoint signals when adapting one of the SCell setup and release to partially avoid the collision.

23. The UE according to claim 19, wherein the communication circuitry is further configured to signal to the network node that the UE has capability to adapt one of the SCell setup and release of the SCell when the UE performs the measurement on downlink disjoint signals.

24. The UE according to claim 19, wherein the communication circuitry further is configured to receive, from the network node, the network node's capability to adaptively configure SCell command when the UE performs the measurement on downlink disjoint signals.

* * * * *

UNITED STATES PATENT AND TRADEMARK OFFICE
CERTIFICATE OF CORRECTION

PATENT NO. : 9,634,820 B2
APPLICATION NO. : 14/130124
DATED : April 25, 2017
INVENTOR(S) : Kazmi et al.

It is certified that error appears in the above-identified patent and that said Letters Patent is hereby corrected as shown below:

In the Specification

In Column 2, Lines 11-28, delete "According to a first...........every subframe." and
insert -- According to a first aspect of embodiments herein, the object is achieved by a
method in a network node for adapting a Secondary cell, SCell, command to a user
equipment, UE. The SCell command is one of a setup and release command. The UE is a
multi-carrier capable UE. The network node adapts the SCell command by one of advancing
and delaying the timing of sending said SCell command with respect to a start of a
transmission of at least one of:
disjoint signals on which one of the UE and the network node is performing a
measurement, the disjoint signal is a signal that is not used for performing the
measurement in every subframe,
disjoint signals of a data transmission to the UE, the disjoint signal is a signal that
is not used for transmitting the data in every subframe, and
disjoint signals of a data reception from the UE, the disjoint signal is a signal that
is not used for receiving the data reception in every subframe. --, therefor.

In Column 2, Lines 29-46, delete "According to a second...........every subframe." and
insert -- According to a second aspect of embodiments herein, the object is achieved by a
method in a User Equipment, UE, for adapting one of a Secondary Cell, SCell, setup and
release. The UE being served by a network node. The UE receives one of a SCell setup and
release command from the network node. The UE then adapts one of the SCell setup and
release by delaying the timing of applying said command to at least partly avoid collision with
a transmission of at least one of:
disjoint signals on which one of the UE and the network node is performing a
measurement, the disjoint signal is a signal that is not used for performing the
measurement in every subframe, Signed and Sealed this
Fifteenth Day of August, 2017

Joseph Matal
*Performing the Functions and Duties of the*
*Under Secretary of Commerce for Intellectual Property and*
*Director of the United States Patent and Trademark Office* disjoint signals of a data transmission to the network node, the disjoint signal is a signal that is not used for transmitting the data in every subframe, and
disjoint signals of a data reception from the network node, the disjoint signal is a
signal that is not used for receiving the data reception in every subframe. --, therefor.

In Column 2, Lines 47-64, delete "A network node...........subframe." and
insert -- A network node for adapting a Secondary cell, SCell, command to a user equipment, UE, the SCell command is one of a setup and release command, and UE 120 is a multi-carrier capable UE. The network node comprises a processor configured to adapt the SCell command by one of advancing and delaying the timing of sending said SCell command with respect to a start of a transmission of at least one of:
disjoint signals on which one of the UE and the network node is performing a
measurement, the disjoint signal is a signal that is not used for performing the
measurement in every subframe,
disjoint signals of a data transmission to the UE, the disjoint signal is a signal that is not used for transmitting the data in every subframe, and
disjoint signals of a data reception from the UE, the disjoint signal is a signal that
is not used for receiving the data reception in every subframe. --, therefor.

In Columns 2 & 3, Lines 65-67 & 1-17, delete "According to...........every subframe." and
insert -- According to a fourth aspect of embodiments herein, the object is achieved by a User Equipment, UE, for adapting one of a Secondary Cell, SCell, setup and release. The UE being configured to be served by a network node. The UE comprises a communication circuitry configured to receive one of an SCell setup and release command from the network node. The UE further comprises a processor configured to adapt one of the SCell setup and release by delaying the timing of applying the SCell command to at least partly avoid collision with a transmission of at least one of:
disjoint signals on which one of the UE and the network node is performing a
measurement, the disjoint signal is a signal that is not used for performing the
measurement in every subframe,
disjoint signals of a data transmission to the network node, the disjoint signal is a signal that is not used for transmitting the data in every subframe, and
disjoint signals of a data reception from the network node, the disjoint signal is a
signal that is not used for receiving the data reception in every subframe. --, therefor.

In Column 13, Line 51, delete "Such as" and insert -- such as --, therefor.

In the Claims

In Column 31, Line 10, in Claim 6, delete "Signaling" and insert -- signaling --, therefor.

In Column 31, Line 42, in Claim 11, delete "the performs" and insert -- the UE performs --, therefor.